(12) United States Patent
Harugaichi et al.

(10) Patent No.: US 12,046,733 B2
(45) Date of Patent: Jul. 23, 2024

(54) VEHICLE BATTERY PACK

(71) Applicant: MAZDA MOTOR CORPORATION, Hiroshima (JP)

(72) Inventors: Shintaro Harugaichi, Aki-gun (JP); Satoshi Yamamoto, Aki-gun (JP); Kazuo Iwata, Aki-gun (JP); Yu Yan, Aki-gun (JP); Shoichi Sasaki, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 351 days.

(21) Appl. No.: 16/990,806

(22) Filed: Aug. 11, 2020

(65) Prior Publication Data

US 2021/0057792 A1 Feb. 25, 2021

(30) Foreign Application Priority Data

Aug. 21, 2019 (JP) ................................. 2019-151391

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/615* (2015.04);
(Continued)

(58) Field of Classification Search
CPC ........... H01M 10/6556; H01M 10/613; H01M 10/615; H01M 10/625; H01M 10/6571; H01M 50/20; H01M 50/209; H01M 2220/20; H01M 10/6554; H01M 50/249; H01M 10/617; H01M 10/6567;
(Continued)

(56) References Cited

U.S. PATENT DOCUMENTS

2013/0071707 A1 3/2013 Koester et al.
2015/0044540 A1 2/2015 Morton et al.
(Continued)

FOREIGN PATENT DOCUMENTS

CN 107331921 A * 11/2017 .......... H01M 10/613
CN 110190360 A * 8/2019 .......... H01M 10/613
(Continued)

OTHER PUBLICATIONS

The extended European search report issued by the European Patent Office on Jan. 26, 2021, which corresponds to European Patent Application No. 20189748.5-1108 and is related to U.S. Appl. No. 16/990,806.

*Primary Examiner* — Kaity V Chandler
(74) *Attorney, Agent, or Firm* — Studebaker & Brackett PC

(57) ABSTRACT

A vehicle battery pack capable of suppressing a variation in cooling performance for a battery module by a cooling pipe. A vehicle battery pack includes a cooling pipe in a flat plate shape that abuts a lower surface of respective one of battery modules; and an elastic urging member that urges the cooling pipe upward to make the cooling pipe abut the lower surface of respective one of the battery modules. The elastic urging member has plural elastically-deformable legs that are aligned in a longitudinal direction of the cooling pipe.

18 Claims, 18 Drawing Sheets

(51) Int. Cl.
*H01M 10/615* (2014.01)
*H01M 10/625* (2014.01)
*H01M 10/6571* (2014.01)
*H01M 50/20* (2021.01)

(52) U.S. Cl.
CPC ..... *H01M 10/625* (2015.04); *H01M 10/6571* (2015.04); *H01M 50/20* (2021.01)

(58) Field of Classification Search
CPC .... H01M 10/6568; Y02E 60/10; Y02T 10/70; B60L 50/64; B60L 58/26
See application file for complete search history.

(56) References Cited

U.S. PATENT DOCUMENTS

2016/0006086 A1 1/2016 Loew et al.
2020/0243928 A1* 7/2020 Schmidt .............. H01M 10/625

FOREIGN PATENT DOCUMENTS

| | | | | |
|---|---|---|---|---|
| CN | 209571526 U | * | 11/2019 | |
| CN | 209675453 U | * | 11/2019 | ............. Y02E 60/10 |
| CN | 102010443 B1 | * | 4/2020 | ............. Y02E 60/10 |
| CN | 210379149 U | * | 4/2020 | ............. Y02E 60/10 |
| CN | 210489777 U | * | 5/2020 | ............. Y02E 60/10 |
| DE | 10 2008 059953 A1 | | 6/2010 | |
| DE | 10 2013 225628 A1 | | 6/2014 | |
| FR | 3066326 A1 | | 11/2018 | |
| JP | 2012123983 A | * | 6/2012 | ............. Y02E 60/10 |
| JP | 2013-069690 A | | 4/2013 | |
| WO | 2013/171205 A1 | | 11/2013 | |
| WO | 2014/114545 A1 | | 7/2014 | |
| WO | WO-2017045928 A1 | * | 3/2017 | .......... H01M 10/613 |

* cited by examiner

VEHICLE BATTERY PACK

TECHNICAL FIELD

The present disclosure relates to a vehicle battery pack that includes a cooling mechanism for cooling a battery module.

BACKGROUND ART

Conventionally, a battery module is mounted on an electric vehicle, a hybrid vehicle, and the like. A temperature of the battery module is likely to be increased in a use state during travel of the electric vehicle, and the like. Thus, the battery module has to be cooled to an appropriate temperature for use of the battery module.

To handle the above problem, as disclosed in JP-A-2013-69690, the conventional vehicle such as the electric vehicle includes a cooling system that includes a cooling pipe in contact with a lower surface of the battery module. This cooling system includes a spring sheet functioning as a plate spring that makes the cooling pipe abut the lower surface of the battery module. The spring sheet has an abutment portion that abuts the cooling pipe; and an elastically-deformable arm portion. The abutment portion is pressed against the cooling pipe by an urging force that is generated by elastic deformation of the arm portion. The abutment portion and the arm portion continuously extend along a longitudinal direction of the cooling pipe. The arm portion urges an entire length of the abutment portion to the cooling pipe.

SUMMARY

In the above cooling system, the spring sheet is used to make the cooling pipe abut the lower surface of the battery module, and this spring sheet has the arm portion that continuously extends along the longitudinal direction of the cooling pipe. In such a spring sheet, the urging force for urging the cooling pipe to the lower surface of the battery module possibly fluctuates according to the temperature of the battery module in the use state. For example, the arm portion is softened in a high-temperature time of the battery module. On the contrary, the arm portion is hardened in a low-temperature time thereof. Accordingly, a variation in the urging force for urging the cooling pipe to the lower surface of the battery module is significant. As a result, cooling performance for the battery module by the cooling pipe varies.

The present disclosure has been made in view of the above circumstance and therefore provides a vehicle battery pack capable of suppressing a variation in cooling performance for a battery module by a cooling pipe.

The vehicle battery pack according to the present disclosure is a vehicle battery pack that includes a battery module; a cooling pipe in a flat plate shape that abuts a surface of the battery module; and an urging member that urges the cooling pipe in a direction to abut the surface of the battery module. The urging member has plural elastically-deformable legs that are aligned in a longitudinal direction of the cooling pipe.

According to such a configuration, since the urging member has the plural elastically-deformable legs that are aligned in the longitudinal direction of the cooling pipe, it is possible to urge the cooling pipe to the surface of the battery module by each of the legs. In this way, it is possible to suppress a variation in an urging force received by the cooling pipe between a high-temperature time and a low-temperature time. As a result, in a state of receiving the urging force, the variation in which is suppressed (that is, a state where a variation in thermal contact resistance is suppressed), the cooling pipe abuts the surface of the battery module, and thus it is possible to suppress a variation in cooling performance for the battery module by the cooling pipe.

In the above vehicle battery pack, preferably, the surface of the battery module is a lower surface of the battery module.

According to such a configuration, it is possible to urge the cooling pipe to the lower surface of the battery module by each of the legs of the urging member. In this configuration, the battery module is placed on the cooling pipe, and thus the urging member can receive weight of the battery module via the cooling pipe. As a result, the urging member is elastically deformed by using the weight of the battery module and can urge the cooling pipe to the lower surface of the battery module by using a restoring force of the urging member. Therefore, with a simple structure that the battery module, the cooling pipe, and the urging member are stacked and arranged in a vertical direction, it is possible to suppress the variation in the urging force received by the cooling pipe and to suppress the variation in the cooling performance for the battery module by the cooling pipe.

In the above vehicle battery pack, preferably, a tip of each of the legs has a curved surface shape.

According to such a configuration, since the tip of each of the legs has the curved surface shape, each of the legs can smoothly and elastically be deformed when each of the legs abuts an abutment surface of a case for the battery pack, or the like. As a result, an impact of a variation in the tip shape of the legs becomes small, and thus the cooling pipe can reliably be urged to the battery module.

In the above vehicle battery pack, preferably, each of the legs has a hollow shape.

According to such a configuration, since each of the legs has the hollow shape, each of the legs can smoothly and easily be deformed elastically when each of the legs abuts the abutment surface of the case for the battery pack, or the like. As a result, even in the case where an attachment error of the cooling pipe or the battery module occurs, such an error can reliably be absorbed by elastic deformation of the legs, and thus it is possible to further reliably urge the cooling pipe to the battery module.

In the above vehicle battery pack, preferably, each of the legs has a tapered shape.

According to such a configuration, since each of the legs has the tapered shape, each of the legs can smoothly and elastically be deformed when each of the legs abuts the abutment surface of the case for the battery pack, or the like. As a result, the impact of the variation in the tip shape of the legs becomes small, and thus the cooling pipe can reliably be urged to the battery module.

In the above vehicle battery pack, preferably, the urging member is configured to be divided into plural pieces.

According to such a configuration, it is possible to improve productivity of the urging member.

In the above vehicle battery pack, preferably, the battery module has plural sheets of battery cells, the number of the legs is the same as the number of the battery cells, the plural legs are arranged in alignment in an alignment direction of the plural sheets of the battery cells, and each of the legs is arranged at a position capable of applying an urging force to respective one of the battery cells.

According to such a configuration, the plural legs of the urging member can apply the uniform urging force to the plural sheets of the battery cells in the battery module.

Preferably, the above vehicle battery pack further includes a holding member that is arranged between the cooling pipe and the urging member and holds the urging member on the cooling pipe.

According to such a configuration, since the holding member holds the cooling pipe at a position between the cooling pipe and the urging member, it is possible to improve a holding property for the cooling pipe. As a result, the urging member applies the uniform urging force to the cooling pipe, and thus the battery module can be cooled evenly by the cooling pipe.

Preferably, the above vehicle battery pack further includes a heater that heats the battery module, and the holding member holds the heater at a position capable of heating the battery module.

According to such a configuration, since the holding member holds the heater at the position capable of heating the battery module, it is possible to reliably heat the battery module evenly.

According to the vehicle battery pack in the present disclosure, it is possible to suppress the variation in the cooling performance for the battery module by the cooling pipe.

DETAILED DESCRIPTION

A detailed description will hereinafter be made on a preferred embodiment of a vehicle battery pack according to the present disclosure with reference to the accompanying drawings. In the following drawings, a vehicle width direction, a vehicle longitudinal direction, and a vehicle vertical direction are respectively indicated by a double-headed arrow X, a double-headed arrow Y, and a double-headed arrow Z. Furthermore, a vehicle front direction is indicated by an arrow Y1.

(Overall Configuration of Electric Vehicle 1)

Figure 1:
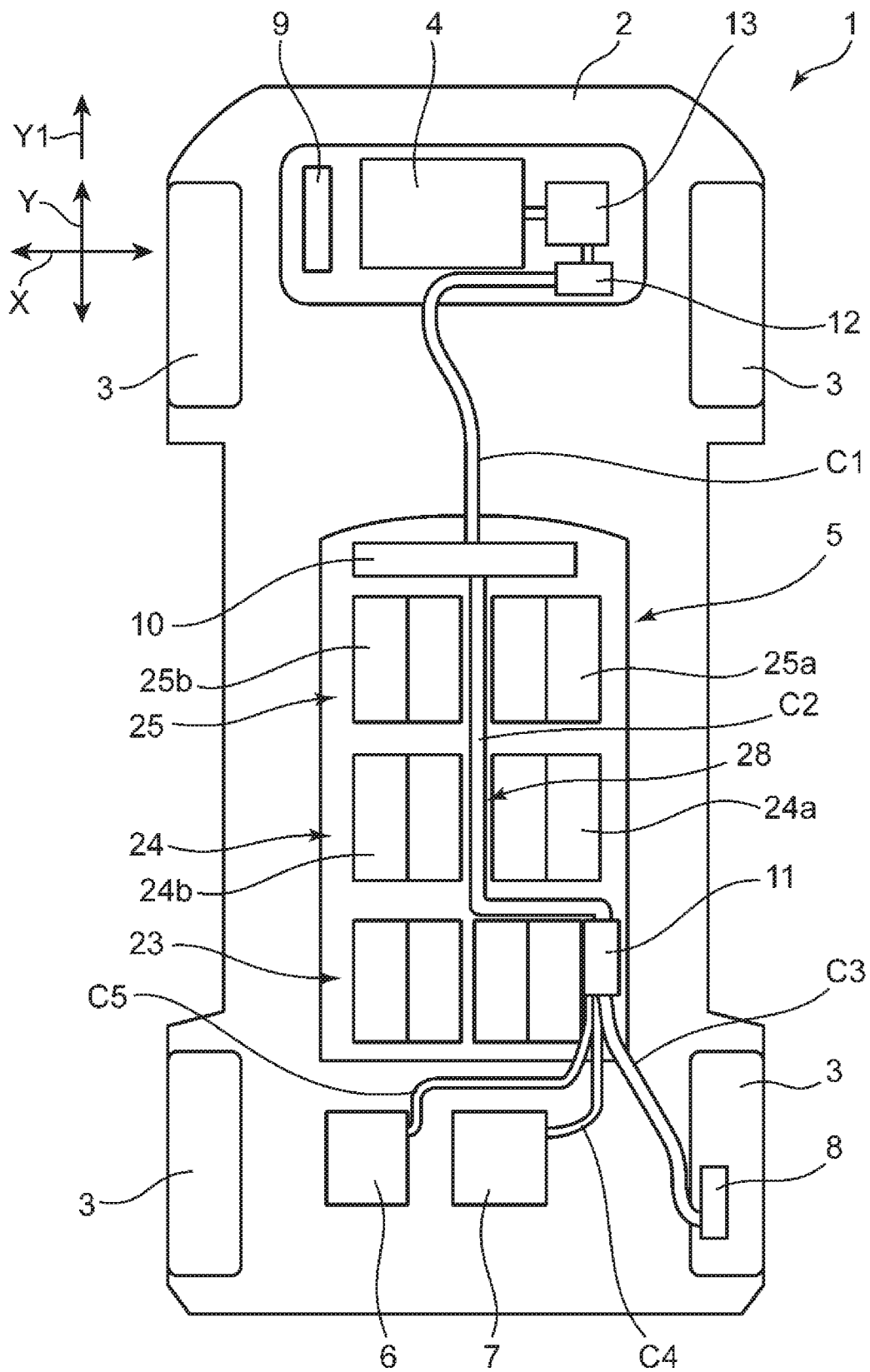
FIG. 1 is a plan view illustrating a basic configuration of a vehicle that includes a battery pack according to an embodiment of the present disclosure.

An electric vehicle 1 illustrated in FIG. 1 is configured to include a vehicle battery pack 5 near a portion under a floor of a cabin in a vehicle body 2, and the vehicle battery pack 5 includes three battery module groups 23, 24, 25.

More specifically, the electric vehicle 1 includes: wheels 3 that are arranged on both sides in front and rear portions of the vehicle body 2; a motor 4 that rotationally drives the two wheels 3 on the front side of the vehicle body 2; the battery pack 5; a power feeder 6 that reduces a voltage of power of the battery pack 5, coverts the power thereof into AC power from DC power, and feeds the AC power to external equipment; a charger 7 that is used in a normal charging time; a quick-charging input section 8; a compressor 9 that is used to air-condition the cabin, the compressor 9 being also used to cool the battery pack 5; first to third junction boxes 10, 11, 12 as three electrical connection boxes; and an inverter 13 provided between the third junction box 12 and the motor 4.

Each of the first to third junction boxes 10, 11, 12 constitutes the electrical connection box by accommodating electrical circuits, electrical components, or the like such as a relay circuit and a fuse in a case. The first junction box 10 includes an overall high-voltage system that is connected to all battery modules in the battery pack 5. The second junction box 11 includes a charging circuit such as a quick-charging circuit, and is directly or indirectly connected to all of the battery modules in the battery pack 5 so as to be able to charge these battery modules. The third junction box 12 includes a vehicle drive circuit and the like. The first and third junction boxes 10, 12 are connected by an electric cable C1. The first and second junction boxes 10, 11 are connected by an electric cable C2 that runs through a clearance 28 at a center of the inside of the battery pack 5. The second junction box 11 is connected to the power feeder 6, the charger 7, and the quick-charging input section 8 via cables C3 to C5, respectively.

The motor 4 is an AC motor and rotationally drives the wheels 3 on both of the sides in the vehicle front direction Y1. A DC current that is supplied from the battery pack 5 to the inverter 13 is converted into an AC current by the inverter 13, and the motor 4 can rotate by using the AC current. Meanwhile, during deceleration of the vehicle, the AC current that is generated by the motor 4 is converted into the DC current by the inverter 13, and the DC current is stored in the battery modules in the battery pack 5.

(Overall Configuration of Battery Pack 5)

Figure 2:
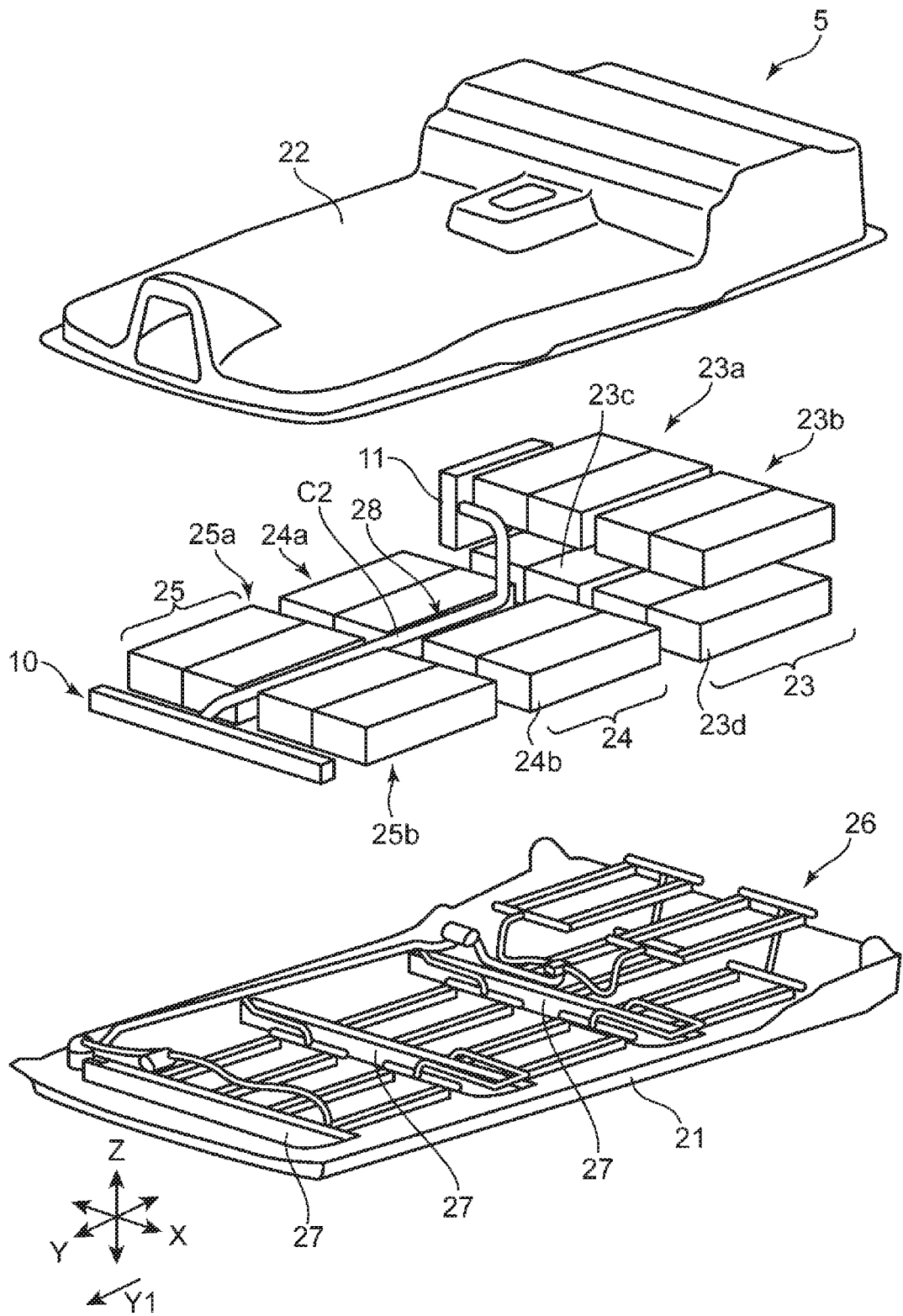
FIG. 2 is an exploded perspective view of the battery pack in FIG. 1.

As illustrated in FIG. 2, the battery pack 5 in this embodiment includes: a lower plate 21; the three battery module groups, that is, the first to third battery module groups 23, 24, 25; an upper cover 22 that covers the first to third battery module groups 23, 24, 25 from above; a cooling mechanism 26 that cools the first to third battery module groups 23, 24, 25; and a plurality of crossmembers 27, each of which extends in the vehicle width direction X on an upper surface of the lower plate 21.

On the lower plate 21, the first to third battery module groups 23, 24, 25 are sequentially aligned in the vehicle longitudinal direction Y toward the vehicle front direction Y1.

The first battery module group 23 provided in two vertical stages is arranged in an empty space on the rearmost side of the vehicle body 2, for example, a space under a rear seat of the vehicle body 2, or the like. That is, the first battery module group 23 includes four battery modules, that is, a first upper-stage battery module 23a, a second upper-stage battery module 23b, a first lower-stage battery module 23c, and a second lower-stage battery module 23d.

The first upper-stage battery module 23a is disposed above the first lower-stage battery module 23c in an overlapping manner with the first lower-stage battery module 23c in the vehicle vertical direction Z. The second lower-stage battery module 23d is disposed in alignment with the first lower-stage battery module 23c in the vehicle width direction X. The second upper-stage battery module 23b is disposed above the second lower-stage battery module 23d in an overlapping manner with the second lower-stage battery module 23d in the vehicle vertical direction Z.

Figure 5:
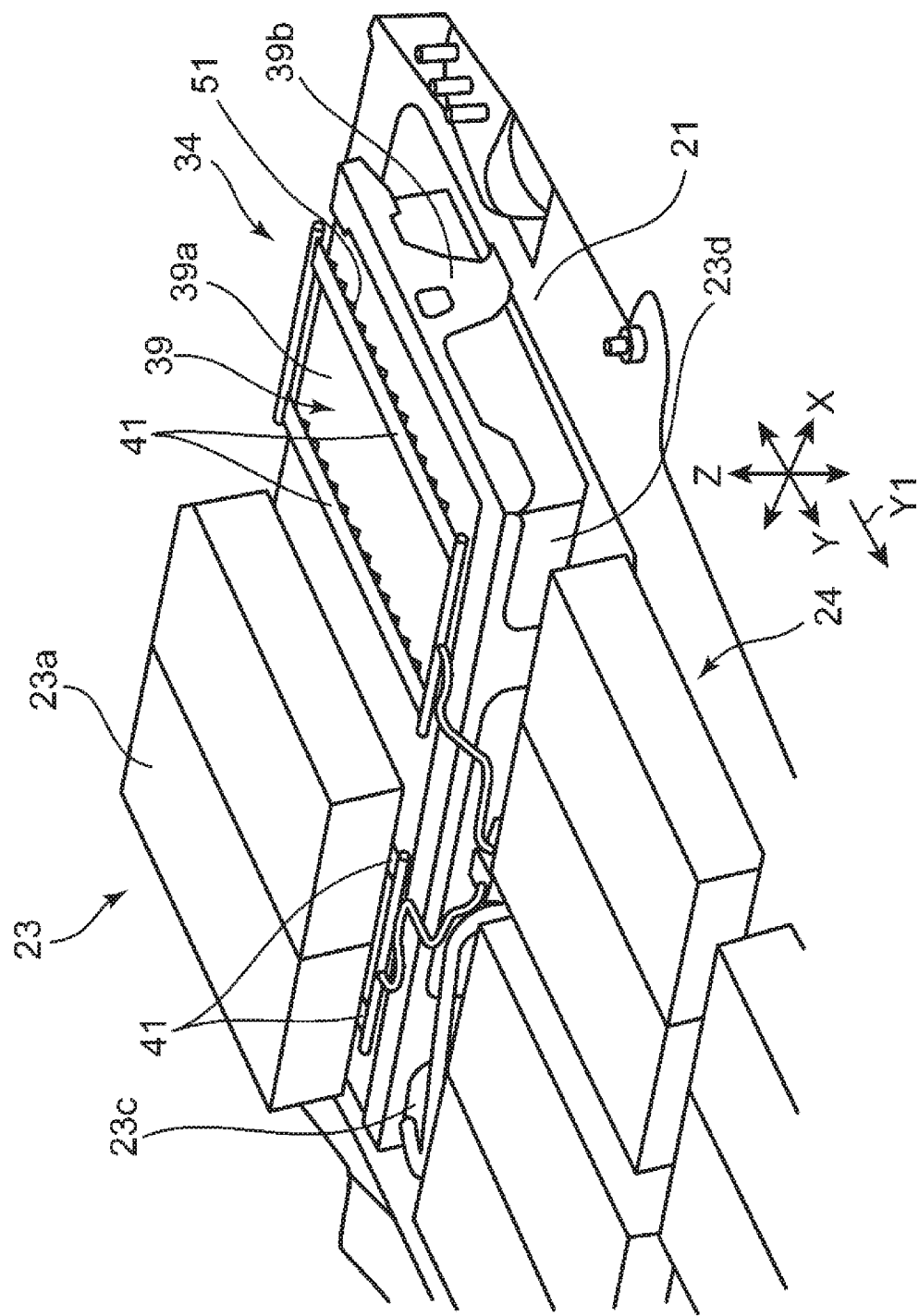
FIG. 5 is a perspective explanatory view illustrating a mount on which upper-stage battery modules in a first battery module group in FIG. 2 are mounted, and a peripheral portion thereof.

The first upper-stage and second upper-stage battery modules 23a, 23b are attached onto a mount 39, which is illustrated in FIG. 5 and is provided on the lower plate 21, and are thereby arranged on the first lower-stage and second lower-stage battery modules 23c, 23d, respectively.

The mount 39, which is illustrated in FIG. 5, has a base 39a and a plurality of legs 39b, each of which extends downward from a circumferential edge of the base 39a. A lower end portion of the leg 39b is fixed to the lower plate 21.

Figure 6:
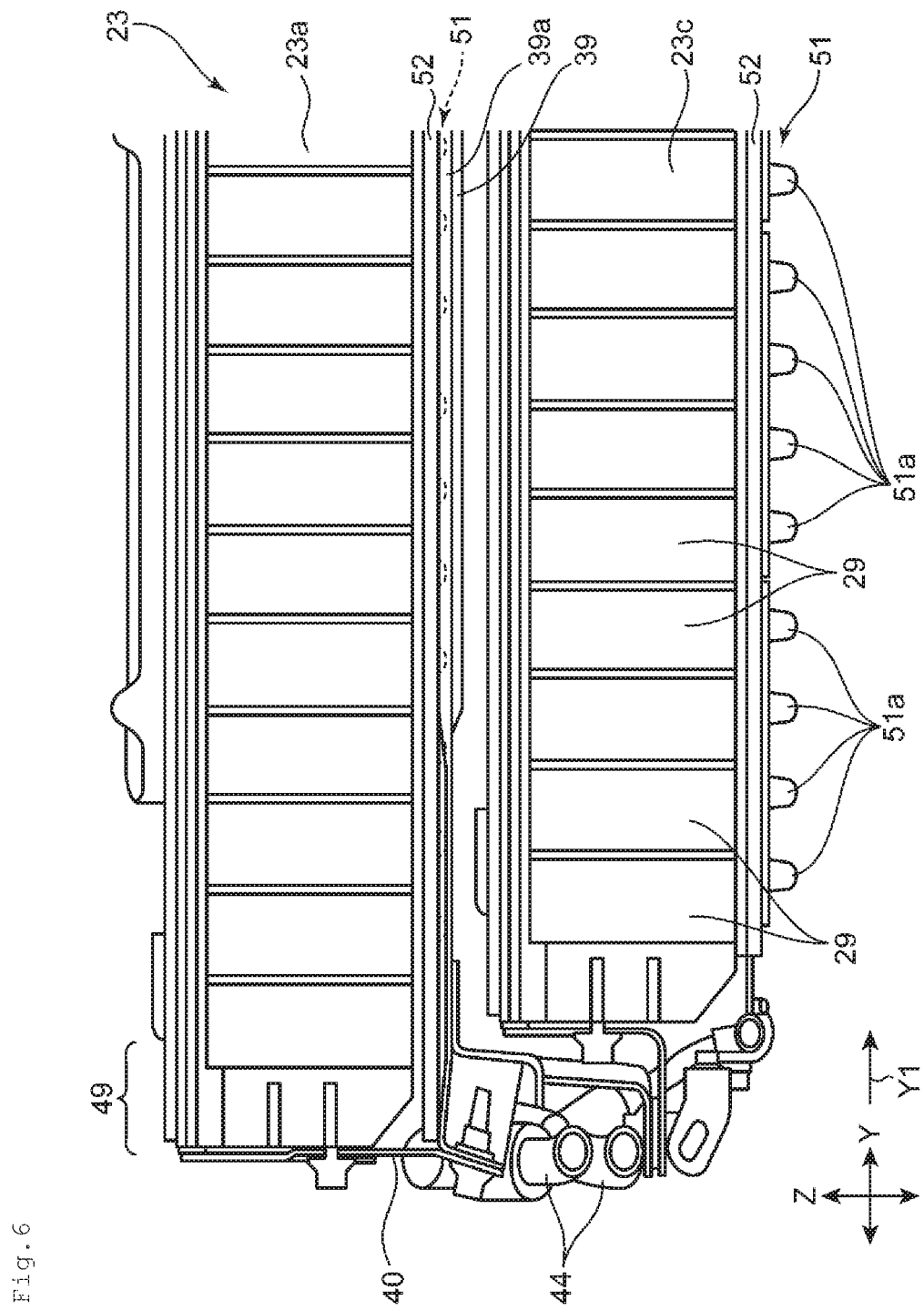
FIG. 6 is a cross-sectional explanatory view illustrating a state where the battery modules in the first battery module group in FIG. 2 are arranged in two vertical stages.

In addition, in this embodiment, as illustrated in FIGS. 5 to 6, the first upper-stage and second upper-stage battery modules 23a, 23b are arranged to be projected more to a vehicle rear side (an opposite direction side from the arrow Y1) than rear ends of the first lower-stage and second lower-stage battery modules 23c, 23d.

As illustrated in FIGS. 1 to 2, the second battery module group 24 is arranged on the vehicle front direction Y1 side of the first battery module group 23 (near an intermediate portion of the lower plate 21 in the vehicle longitudinal direction Y). The second battery module group 24 includes battery modules 24a, 24b provided in a single stage. The battery modules 24a, 24b are disposed in alignment in the vehicle width direction X.

The third battery module group 25 is arranged on the vehicle front direction Y1 side of the second battery module group 24, that is, the foremost side of the vehicle body 2. The third battery module group 25 includes battery modules 25a, 25b provided in a single stage. The battery modules 25a, 25b are arranged in alignment in the vehicle width direction X.

(Description on Cooling Mechanism 26)

Figure 3:
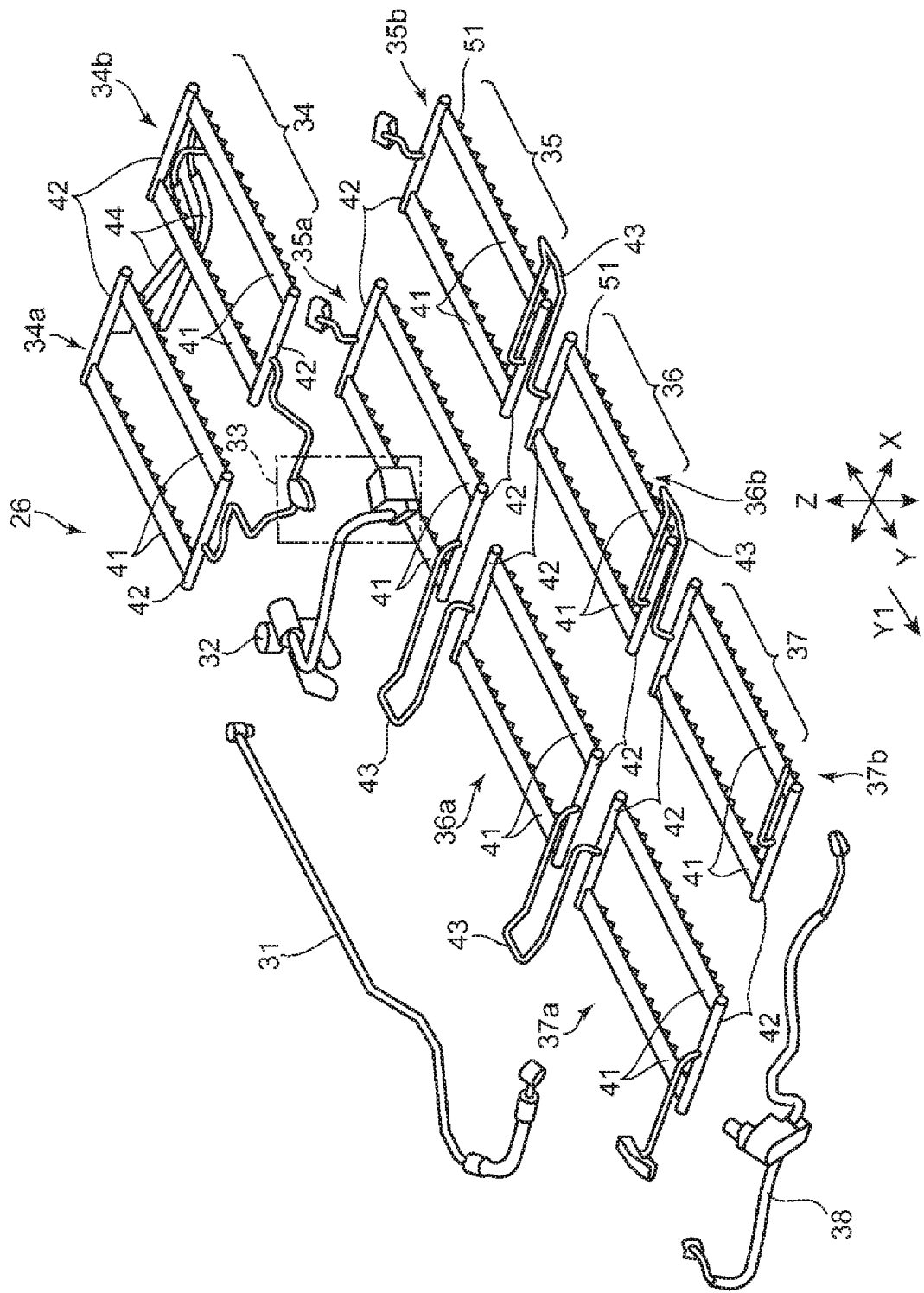
FIG. 3 is an exploded perspective view of a cooling mechanism in FIG. 2.
Figure 4:
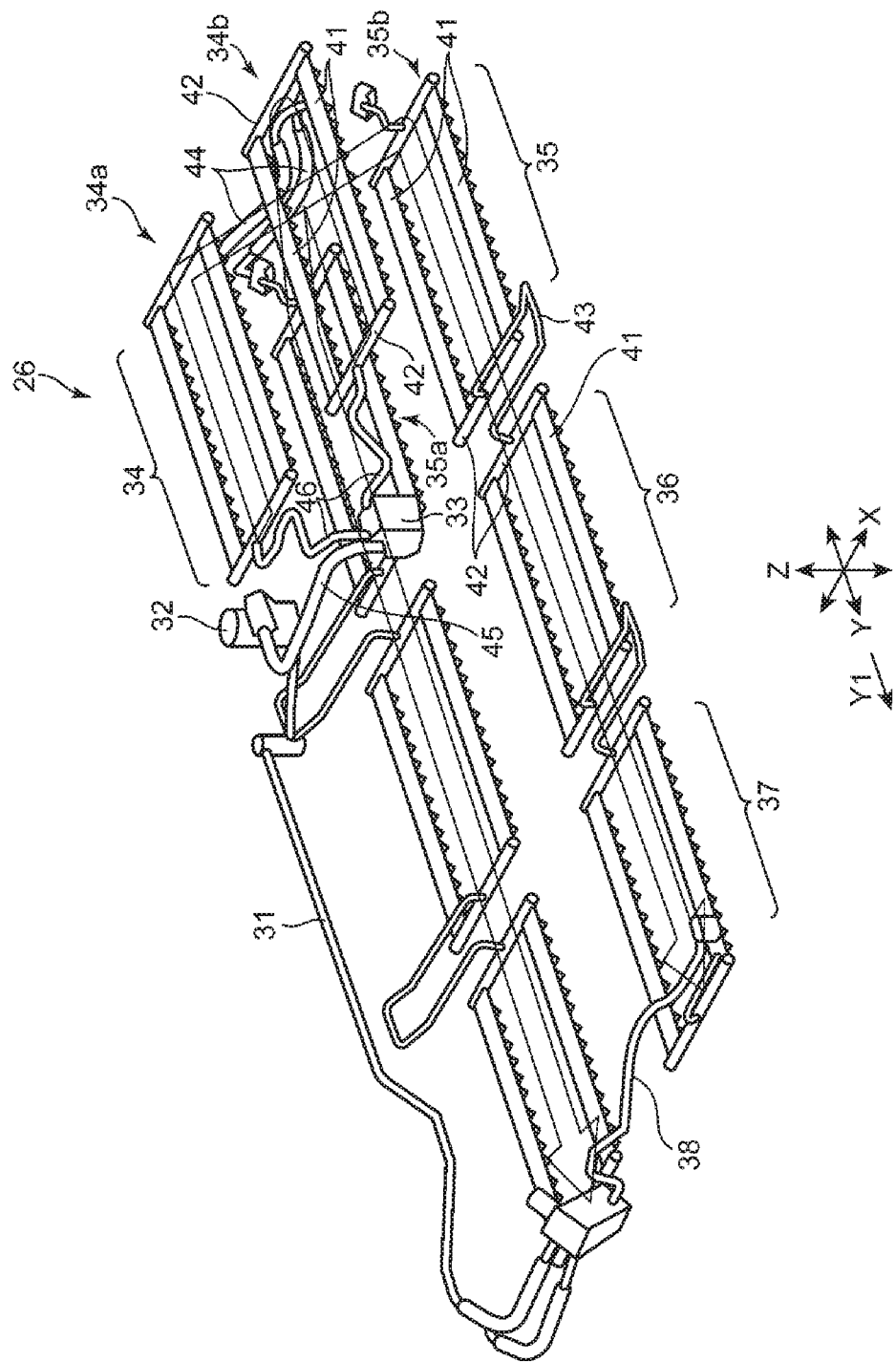
FIG. 4 is a perspective explanatory view illustrating a flow of a refrigerant in the cooling mechanism in FIG. 3.

As illustrated in FIGS. 2 to 4, the cooling mechanism 26 includes cooling pipes 41, each of which is provided Zat a position abutting a lower surface of respective one of the battery modules 23a to 23d, 24a to 24b, and 25a to 25b in the first to third battery module groups 23, 24, 25, and is configured to supply a refrigerant to these cooling pipes 41 so as to cool these plural battery modules.

More specifically, the cooling mechanism 26 includes an inlet pipe 31, an expansion valve 32, a flow divider 33, a first upper cooling section 34, a first lower cooling section 35, a second cooling section 36, a third cooling section 37, and an outlet pipe 38, and these are connected in series such that the refrigerant flows sequentially. The inlet pipe 31 connects between the compressor 9 (see FIG. 1) and the expansion valve 32.

The refrigerant that is compressed by the compressor 9 is delivered to the expansion valve 32 via the inlet pipe 31, and the expansion valve 32 expands the compressed refrigerant so as to bring the refrigerant into a gas-liquid mixed state. The refrigerant that is expanded by the expansion valve 32 is delivered to the flow divider 33 through a pipe 45. The flow divider 33 divides and delivers the expanded refrigerant to a pair of module cooling sections 34a, 34b in the first upper cooling section 34 through a pipe 46.

The paired module cooling sections 34a, 34b in the first upper cooling section 34 are arranged in alignment in the vehicle width direction X and are each arranged on the base 39a of the mount 39, which is illustrated in FIG. 5. The paired module cooling sections 34a, 34b are arranged below the first upper-stage and second upper-stage battery modules 23a, 23b of the first battery module group 23 in FIG. 2, abut the lower surfaces of these battery modules 23a, 23b, and individually cool the battery modules 23a, 23b, respectively.

Each of the paired module cooling sections 34a, 34b includes: a pair of the cooling pipes 41 extending in the vehicle longitudinal direction Y; and a pair of end pipes 42 extending in the vehicle width direction X.

Each of the cooling pipes 41 is a pipe in a flat plate shape and is manufactured by using metal having superior thermal conductivity such as an aluminum alloy. The cooling pipes 41 are arranged to abut the lower surfaces of the battery modules 23a, 23b. Each of a combination of front end portions and a combination of rear end portions of the paired cooling pipes 41 is connected by the end pipe 42. Accordingly, the refrigerant that is delivered from the flow divider 33 to each of the paired module cooling sections 34a, 34b sequentially flows through the end pipe 42, the pair of the cooling pipes 41, and the end pipe 42 and is next delivered to the first lower cooling section 35.

Similar to the above first upper cooling section 34, the first lower cooling section 35 includes a pair of module cooling sections 35a, 35b aligned in the vehicle width direction X. At a position below the base 39a of the mount 39, which is illustrated in FIG. 5, each of the paired module cooling sections 35a, 35b is arranged on the lower plate 21. The paired module cooling sections 35a, 35b are arranged below the first lower-stage and second lower-stage battery modules 23c, 23d of the first battery module group 23 in FIG. 2, abut the lower surfaces of these battery modules 23c, 23d, and individually cool the battery modules 23c, 23d, respectively. Similar to the above paired module cooling sections 34a, 34b, each of the paired module cooling sections 35a, 35b includes: a pair of the cooling pipes 41 extending in the vehicle longitudinal direction Y; and a pair of the end pipes 42 extending in the vehicle width direction X.

Figure 12:
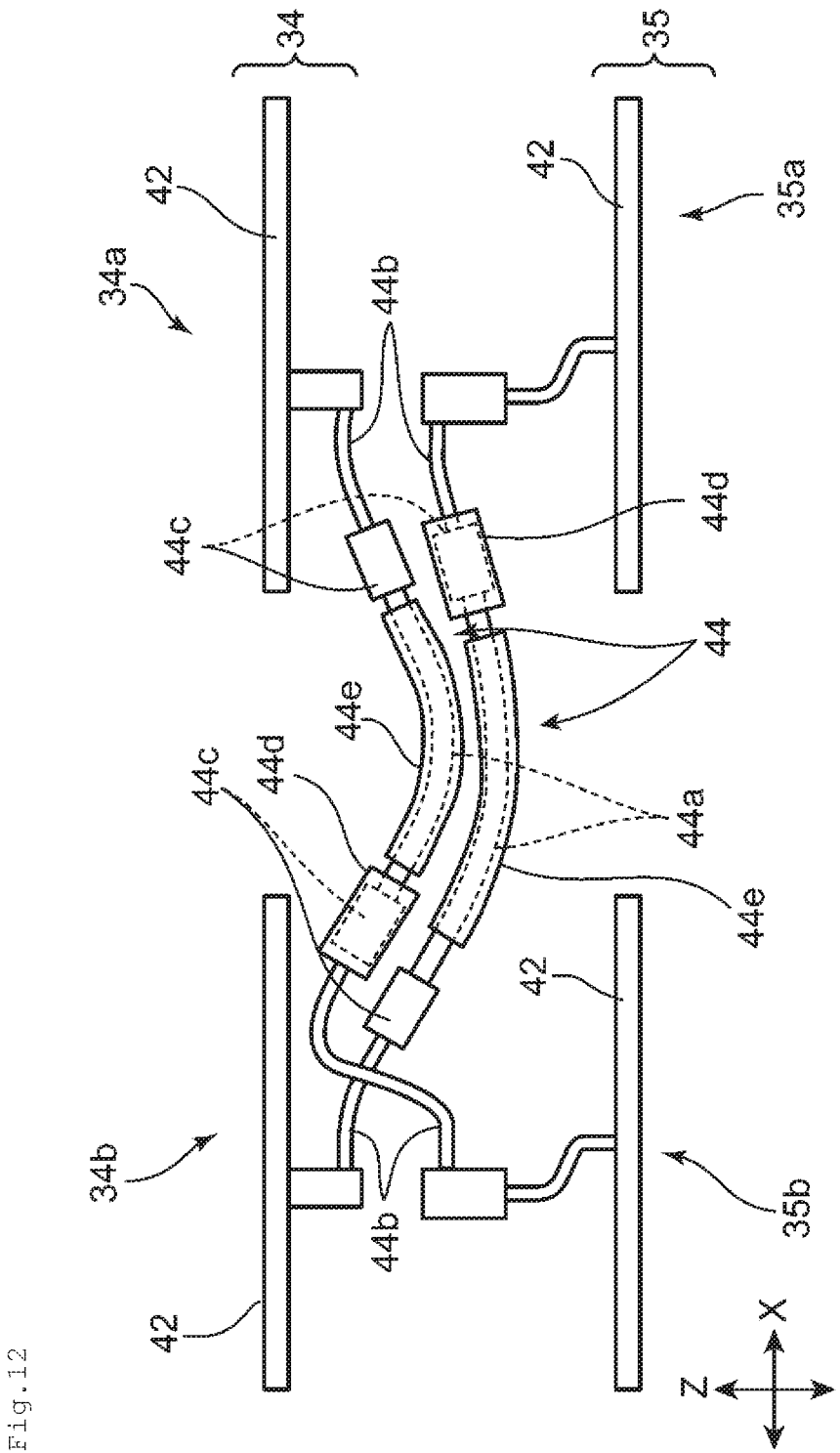
FIG. 12 is a view in which arrangement of a pair of rear connecting pipes in the cooling mechanism in FIG. 3 is seen from the vehicle rear side.
Figure 13:
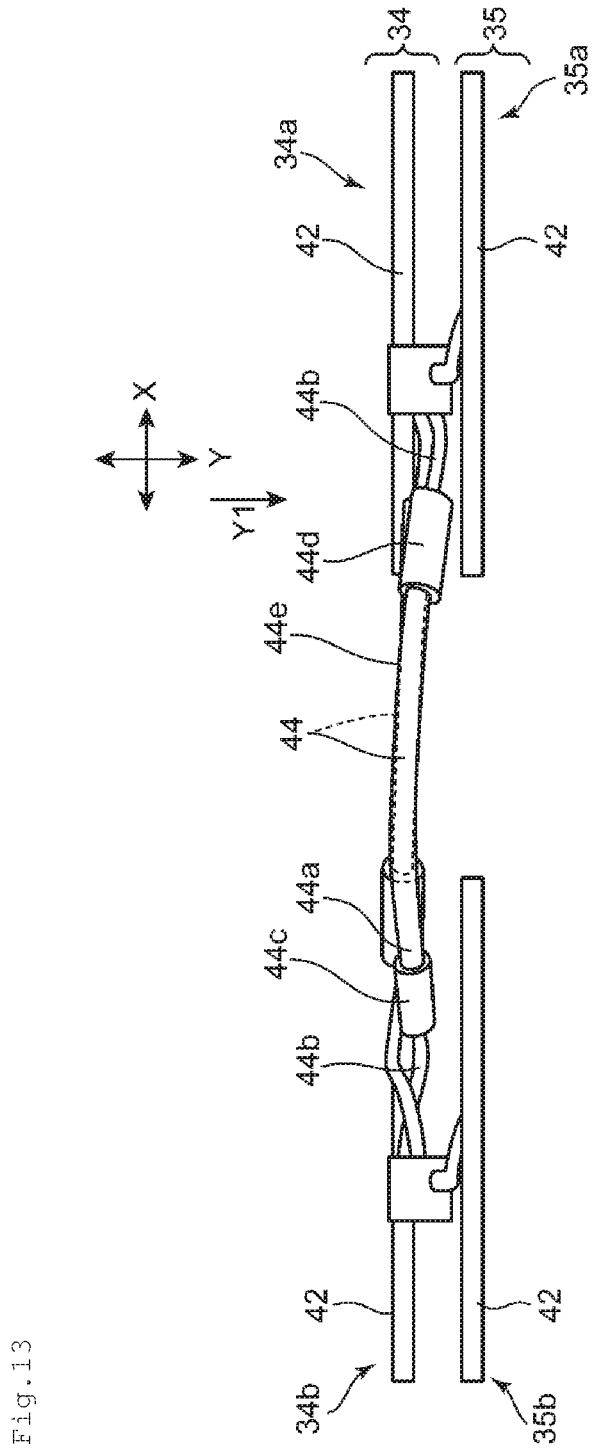
FIG. 13 is a view in which the arrangement of the pair of rear connecting pipes in the cooling mechanism in FIG. 3 is seen from a vehicle lower side.
Figure 14:
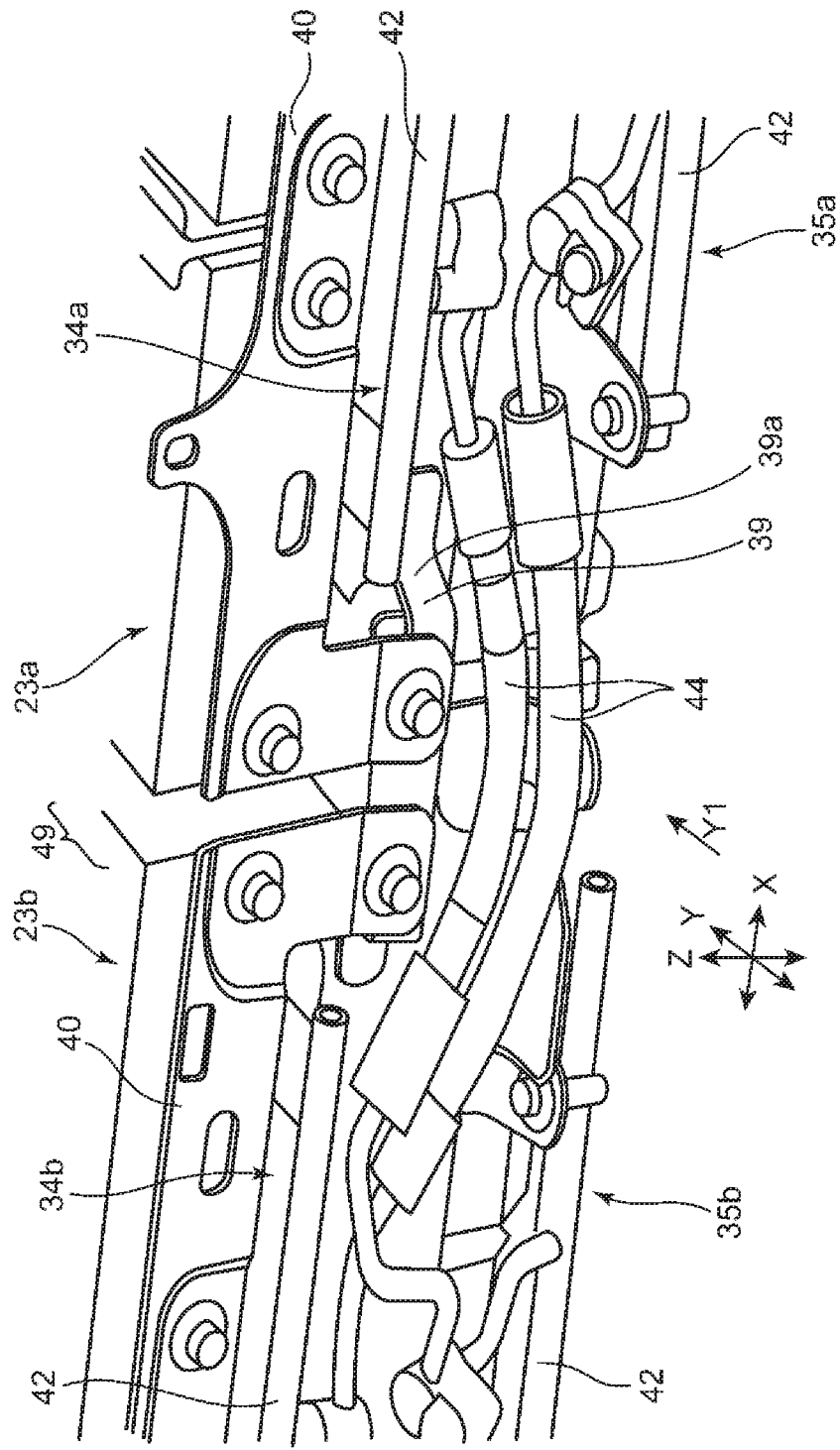
FIG. 14 is a view in which the arrangement of the pair of rear connecting pipes in the cooling mechanism in FIG. 3 is seen obliquely downward from the vehicle rear side.

Here, as illustrated in FIGS. 12 to 14, the end pipe 42 on the vehicle rear side in the module cooling section 35a on a lower right side in FIG. 12 is connected to the end pipe 42 in the module cooling section 34b on an upper left side in FIG. 12 via a rear coupling pipe 44 that extends obliquely upward to the left when seen from the vehicle rear side. Similarly, the end pipe 42 on the vehicle rear side in the module cooling section 35b on a lower left side in FIG. 12 is connected to the end pipe 42 in the module cooling section 34a on an upper right side in FIG. 12 via the rear coupling pipe 44 that extends obliquely upward to the right when seen from the vehicle rear side. Accordingly, in the configuration illustrated in FIGS. 12 to 14, the paired rear coupling pipes 44 extend obliquely upward in a manner to cross each other.

As illustrated in FIGS. 3 to 4, the second cooling section 36 is arranged on the vehicle front direction Y1 side of the first upper cooling section 34 and the first lower cooling section 35. Similar to the above first upper cooling section 34, the second cooling section 36 includes a pair of module cooling sections 36a, 36b aligned in the vehicle width direction X. The pair of module cooling sections 36a, 36b is arranged on the lower plate 21. The paired module cooling sections 36a, 36b are arranged below the paired battery modules 24a, 24b of the second battery module group 24 in FIG. 2, abut the lower surfaces of these battery modules 24a, 24b, and individually cool the battery modules 24a, 24b, respectively. Similar to the above paired module cooling sections 34a, 34b, each of the paired module cooling sections 36a, 36b includes: a pair of the cooling pipes 41 extending in the vehicle longitudinal direction Y; and a pair of the end pipes 42 extending in the vehicle width direction X.

Furthermore, the third cooling section 37 is arranged on the vehicle front direction Y1 side of the second cooling section 36, that is, the foremost side in the vehicle body 2. Similar to the above first upper cooling section 34, the third cooling section 37 includes a pair of module cooling sections 37a, 37b aligned in the vehicle width direction X. The pair of module cooling sections 37a, 37b is arranged on the lower plate 21. The paired module cooling sections 37a, 37b are arranged below the paired battery modules 25a, 25b of the third battery module group 25 in FIG. 2, abut the lower surfaces of these battery modules 25a, 25b, and individually cool the battery modules 25a, 25b, respectively. Similar to the above paired module cooling sections 34a, 34b, each of the paired module cooling sections 37a, 37b includes: a pair of the cooling pipes 41 extending in the vehicle longitudinal direction Y; and a pair of the end pipes 42 extending in the vehicle width direction X.

As illustrated in FIGS. 3 to 4, two each of the three cooling sections 35 to 37 that are aligned in the vehicle longitudinal direction Y on the lower plate 21 (that is, the first lower-stage, second, and third cooling sections 35 to 37) are coupled to each other via a connecting pipe 43 in a laterally-facing U-shape (or a U-shape).

The end pipe 42 on the vehicle front direction Y1 side in each of the paired module cooling sections 37a, 37b of the third cooling section 37 is connected to the outlet pipe 38. The outlet pipe 38 is connected to a condenser, which is not illustrated, in the vehicle. Accordingly, the refrigerant that is used in the above four cooling sections 34 to 37 (that is, the first upper, first lower, second, and third cooling sections 34 to 37) to cool the battery modules in the battery module groups 23 to 25 is delivered to and condensed by the condenser (not illustrated) via the outlet pipe 38, is compressed by the compressor 9 again, and is delivered to the cooling mechanism 26 again to be used to cool the battery modules.

A flow of the refrigerant in the cooling mechanism 26, which is configured as described above, is a flow indicated by bold blank arrows illustrated in FIG. 4. That is, the refrigerant is first introduced into the pair of the module cooling sections 34a, 34b in the first upper cooling section 34 via the inlet pipe 31, the expansion valve 32, and the flow divider 33. The refrigerant that is introduced into the pair of the module cooling sections 34a, 34b is then introduced into the pair of the module cooling sections 35a, 35b in the first lower cooling section 35 while flow directions of the refrigerant are switched (that is, laterally reversed) with respect to the vehicle width direction X through a pair of the crossing rear coupling pipe 44. Thereafter, the refrigerant that is introduced into the pair of the module cooling sections 35a, 35b flows substantially linearly to the pair of the module cooling sections 36a, 36b in the second cooling section 36 on the vehicle front direction Y1 side and the pair of module cooling sections 37a, 37b in the third cooling section 37 via the connecting pipes 43, and finally reaches the outlet pipe 38.

A further detailed description will hereinafter be made on characteristics of the vehicle battery pack 5 in this embodiment.

(Description on Cooling of First Battery Module Group 23)

The vehicle battery pack 5 in this embodiment includes the first battery module group 23 that has the plural battery modules 23a to 23d disposed in the plural stages (the two vertical stages in this embodiment) in the mutually overlapping manner in the vehicle vertical direction Z; and the cooling mechanism 26 that has the cooling pipes 41 (first cooling pipes), each of which cools respective one of the battery modules in the first battery module group 23, and is configured to be able to supply the refrigerant to the cooling pipes 41.

In the first battery module group 23, the plural stages of the battery modules 23a to 23d only need to be disposed and are not limited to the two vertical stages. Three or more stages of the battery modules may be disposed.

The cooling mechanism 26 is configured to intensify cooling of a portion between the battery modules 23a, 23c and a portion between the battery modules 23b, 23d, which are adjacent to each other in the vehicle vertical direction Z, in the first battery module group 23 by the cooling pipes 41 in comparison with other portions of the battery pack 5.

More specifically, the above "other portions" in this embodiment include portions of the battery modules 24a, 24b in the single-stage second battery module group 24 (or the third battery module group 25) that are cooled by the cooling pipes 41 (second refrigerant pipes), that is, the lower surfaces of the battery modules 24a, 24b, and the like.

In detail, the cooling mechanism 26 is configured to supply the refrigerant to the portion between the battery modules 23a, 23c and the portion between the battery modules 23b, 23d, which are adjacent to each other in the vehicle vertical direction Z, in the first battery module group 23 prior to the battery modules 24a, 24b in the single-stage second battery module group 24, so as to intensify cooling of such portions.

More specifically, the cooling pipes 41 (the first cooling pipes) in the portion between the battery modules 23a, 23c and the portion between the battery modules 23b, 23d, which are adjacent to each other in the vehicle vertical direction Z, in the first battery module group 23 provided in the two vertical stages (that is, the cooling pipes 41 in the paired module cooling sections 34a, 34b of the first upper cooling section 34 in FIGS. 3 to 4) are respectively connected in series with the cooling pipes 41 (the second refrigerant pipes) for the battery modules 24a, 24b in the single-stage second battery module group 24 (that is, the cooling pipes 41 in the paired module cooling sections 36a, 36b of the second cooling section 36 in FIGS. 3 to 4).

The cooling pipes 41 in the portion between the battery modules 23a, 23c and the portion between the battery modules 23b, 23d, which are adjacent to each other in the vehicle vertical direction Z, are arranged on an upstream side of the cooling pipes 41 for the battery modules 24a, 24b in a flow direction of the refrigerant.

In the above configuration of the battery pack 5, each of the portion between the battery modules 23a, 23c and the portion between the battery modules 23b, 23d, which are adjacent to each other in the vehicle vertical direction Z, in the first battery module group 23 is a portion where heat is likely to remain during use (that is, during charging/discharging) of the battery modules 23a to 23d. However, it is possible to intensify cooling (that is, improve cooling capacity) of these portions by the cooling pipes 41 in comparison with the other portions of the battery pack 5. In this way, it is possible to suppress a temperature of the multi-stage first battery module group 23 from becoming high. As a result, it is possible to prevent degradation of cooling performance of the battery modules 23a to 23d, which improves reliability.

In addition, in the above configuration of the battery pack 5, it is possible to intensify cooling of the portion between the battery modules 23a, 23c and the portion between the battery modules 23b, 23d, which are adjacent to each other in the vehicle vertical direction Z, in the first battery module group 23 by the cooling pipes 41 in comparison with the other portions, that is, the portions of the battery modules 24a, 24b in the second battery module group 24 having the smaller number of the stage than the first battery module group 23 (the single stage in this embodiment) by the second refrigerant pipes. In this way, it is possible to suppress the temperature of the first battery module group 23, which is the portion most likely to have the highest temperature in the battery pack 5, from becoming high. In other words, it is possible to suppress the temperature of the first battery module group 23 having the multi-stage battery modules 23a to 23d from becoming high by intensifying cooling of the portion between the upper-stage battery modules 23a, 23b and the lower-stage battery modules 23c, 23d in the first battery module group 23 by the cooling pipes 41 in comparison with cooling of the single-stage battery modules 24a, 24b in the second battery module group 24 by the cooling pipes 41.

Furthermore, in the above configuration of the battery pack 5, the cooling pipes 41 (the first cooling pipes) in the portion between the battery modules 23a, 23c and the portion between the battery modules 23b, 23d, which are adjacent to each other in the vehicle vertical direction Z, in the first battery module group 23 provided in the two vertical stages are respectively connected in series with the cooling pipes 41 (second cooling pipes) for the battery modules 24a, 24b of the single-stage second battery module group 24. In addition, the cooling pipes 41 in the portion between the battery modules 23a, 23c and the portion between the battery modules 23b, 23d, which are adjacent to each other in the vehicle vertical direction Z, are arranged on the upstream side of the cooling pipes 41 for the battery modules 24a, 24b in the flow direction of the refrigerant. Accordingly, the cooling mechanism 26 can supply the refrigerant, which has flowed through the cooling pipes 41 in the portion between the battery modules 23a, 23c and the portion between the battery modules 23b, 23d that are adjacent to each other in the vehicle vertical direction Z, to the cooling pipes 41 (the second cooling pipes) for cooling the battery modules 24a, 24b in the second battery module group 24. Thus, it is possible to suppress a temperature of each of the battery modules 23a to 23d in the multi-stage first battery module group 23 from becoming high by supplying the refrigerant in a high cooling performance state to the first battery module group 23 prior to the second battery module group 24.

In the battery pack according to the present disclosure, in order to intensify cooling of the multi-stage first battery module group 23, the cooling mechanism 26 may be configured to be able to supply the refrigerant to the cooling pipes 41 for the first battery module group 23 such that a refrigerant supply amount to the cooling pipes 41 (the first cooling pipes) for the multi-stage first battery module group 23 is larger than a refrigerant supply amount to the cooling pipes 41 (the second cooling pipes) for the second battery module group 24 provided in the smaller number of the stage. For example, the cooling mechanism 26 may be configured to be able to adjust the refrigerant supply amount for each of the battery module groups such that only the refrigerant supply amount to the cooling pipes 41 for the first battery module group 23 (in particular, the cooling pipes 41 in the portion between the battery modules 23a, 23c and the portion between the battery modules 23b, 23d, which are adjacent to each other in the vehicle vertical direction Z) is larger than the refrigerant supply amount to the cooling pipes 41 for each of the other battery module groups 24, 25. With such a configuration, it is possible to supply the larger amount of the refrigerant to the battery modules 23a to 23d in the multi-stage first battery module group 23 than the amount of the refrigerant supplied to the battery modules 24a, 24b in the second battery module group 24 provided in the smaller number of the stage. As a result, it is possible to suppress the temperature of each of the battery modules 23a to 23d in the multi-stage first battery module group 23 from becoming high.

In addition, in the battery pack according to the present disclosure, in order to intensify cooling of the multi-stage first battery module group 23, it may be set that a cross-sectional area of each of the cooling pipes 41 (the first cooling pipes) for the multi-stage first battery module group 23 (in particular, a cross-sectional area of each of the cooling pipes 41 in the portion between the battery modules 23a, 23c and the portion between the battery modules 23b, 23d, which are adjacent to each other in the vehicle vertical direction Z) is larger than a cross-sectional area of each of the cooling pipes 41 (the second cooling pipes) for the second battery module group 24 provided in the smaller number of the stage. Just as described, by increasing the cross-sectional area of each of the cooling pipes 41 for cooling the battery modules 23a to 23d in the first battery module group 23 to be larger than the cross-sectional area of each of the second cooling pipes for cooling the battery modules 24a, 24b in the second battery module group 24, it is possible to supply the larger amount of the refrigerant to the battery modules 23a to 23d in the multi-stage first battery module group 23 than the amount of the refrigerant supplied to the battery modules 24a, 24b in the second battery module group 24 provided in the smaller number of the stage. As a result, it is possible to suppress the temperature of each of the battery modules 23a to 23d in the multi-stage first battery module group 23 from becoming high.

In the case where the cross-sectional area of each of the cooling pipes 41 for the multi-stage first battery module group 23 is increased as described above, the cross-sectional area of each of the cooling pipes 41 for the multi-stage first battery module group 23 may be made larger than the cross-sectional area of each of the cooling pipes 41 for the second battery module group 24 provided in the smaller number of the stage by increasing a width of a surface of each of the cooling pipes 41 that opposes respective one of the battery modules 23a to 23d in an orthogonal direction to the flow direction of the refrigerant to be greater than a width of a surface of each of the cooling pipes 41 (the second cooling pipes) that opposes respective one of the battery modules 24a, 24b in the second battery module group 24 provided in the smaller number of the stage. In such a case, a cooling effect for the battery modules in the multi-stage first battery module group 23 by the cooling pipes 41 is further improved. Thus, it is possible to further suppress the temperature of each of the battery modules 23a to 23d in the multi-stage first battery module group 23 from becoming high.

(Description on Connecting Pipe 43 in Laterally-Facing U-shape)

As illustrated in above FIGS. 3 to 4, in the battery pack 5 in this embodiment, two each of the three cooling sections 35 to 37, which are aligned in the vehicle longitudinal direction Y on the lower plate 21 (that is, the first lower-stage, second, and third cooling sections 35 to 37), are coupled to each other via the connecting pipe 43 in the laterally-facing U-shape (or the U-shape). Both ends of the connecting pipe 43 couple the mutually facing end pipes 42 in respective two of the three cooling sections 35 to 37. In this way, the connecting pipes 43 communicate the cooling pipes 41 in the three cooling sections 35 to 37 with each other in a manner to allow the refrigerant to flow therethrough.

Figure 7:
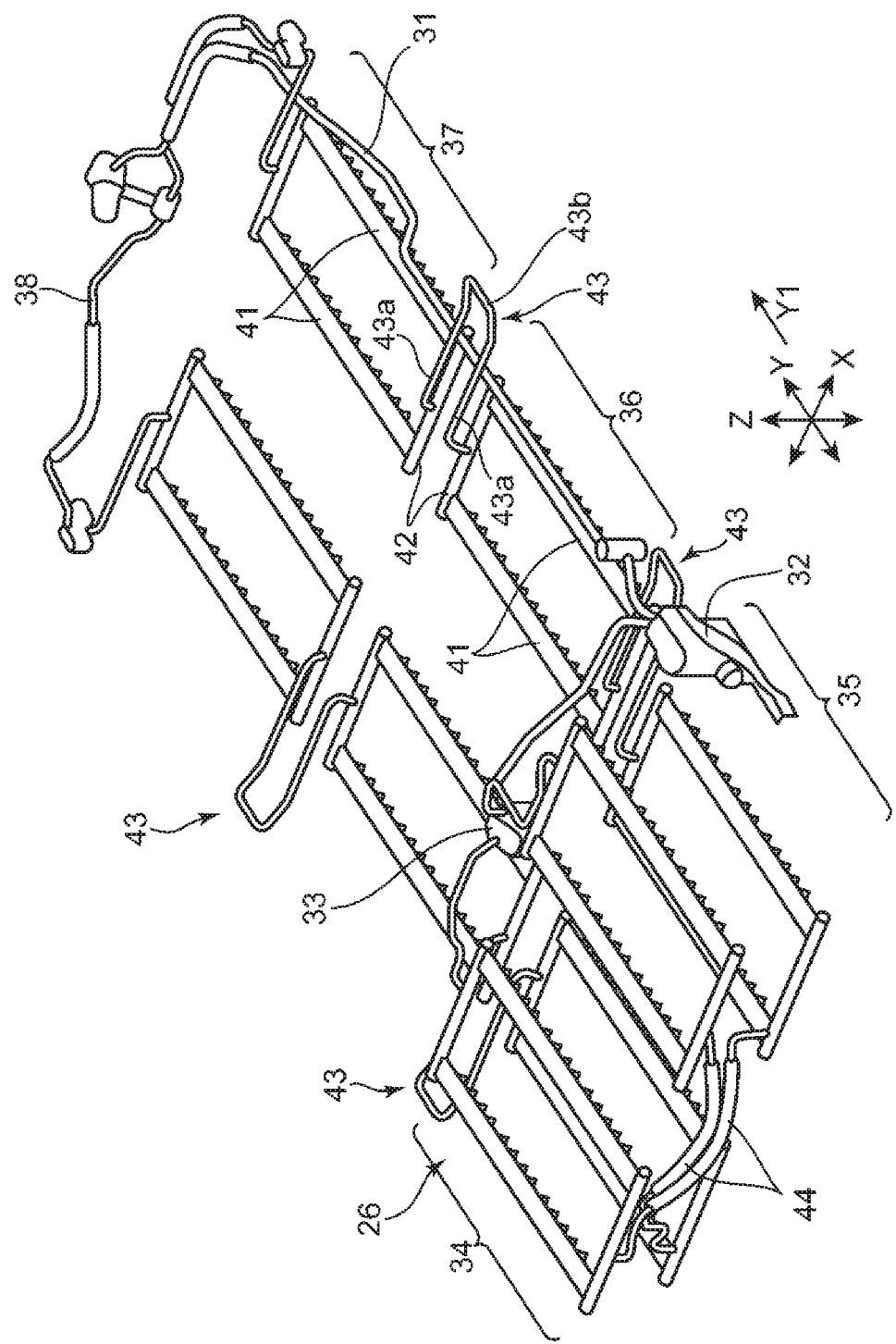
FIG. 7 is a perspective explanatory view of the cooling mechanism in FIG. 2 that is seen obliquely from a rear side of the vehicle.
Figure 8:
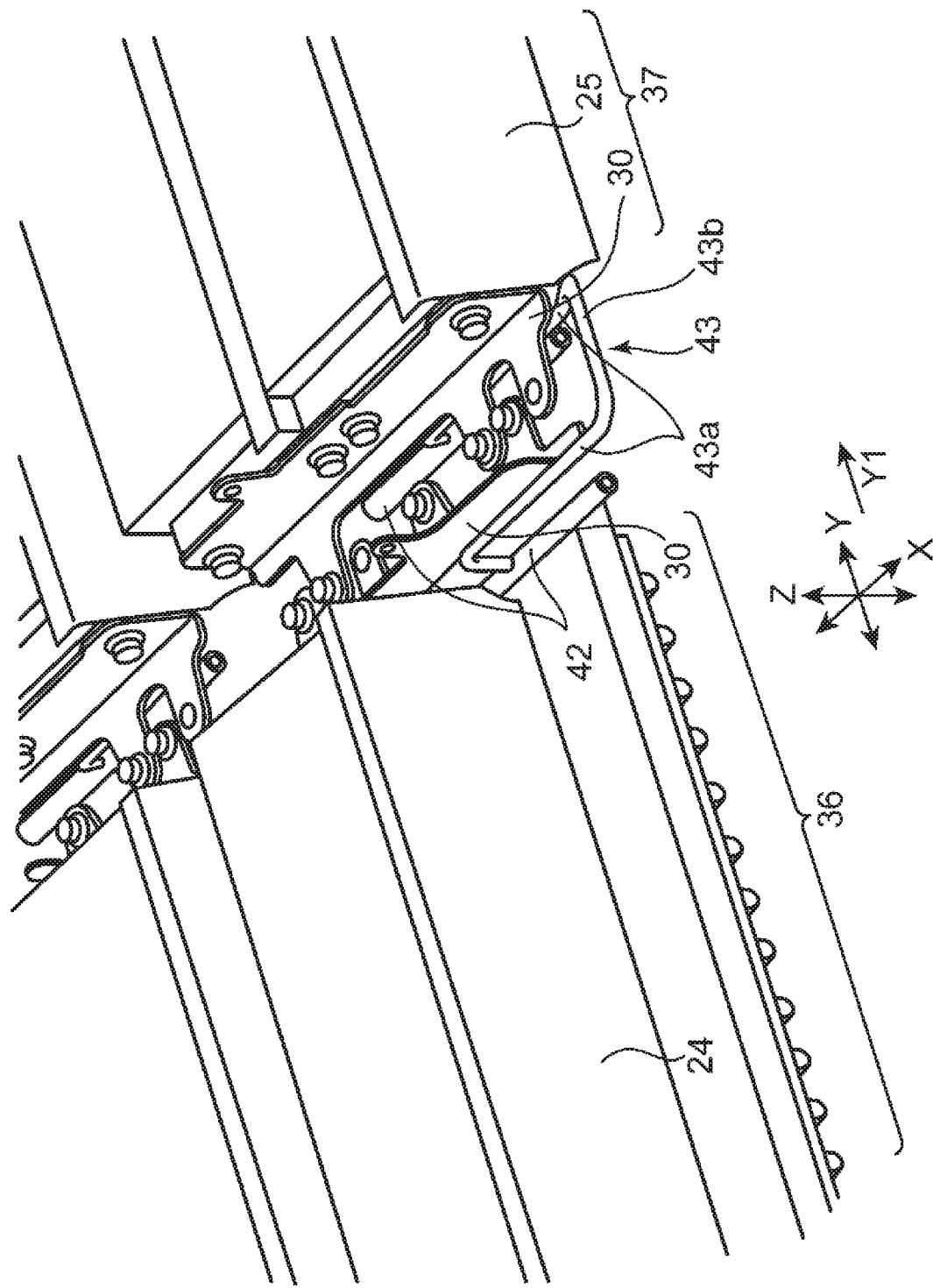
FIG. 8 is an enlarged perspective view illustrating arrangement of a battery module fixing section between two adjacent battery module groups in the battery pack in FIG. 2 and of a connecting pipe below the fixing section.
Figure 11:
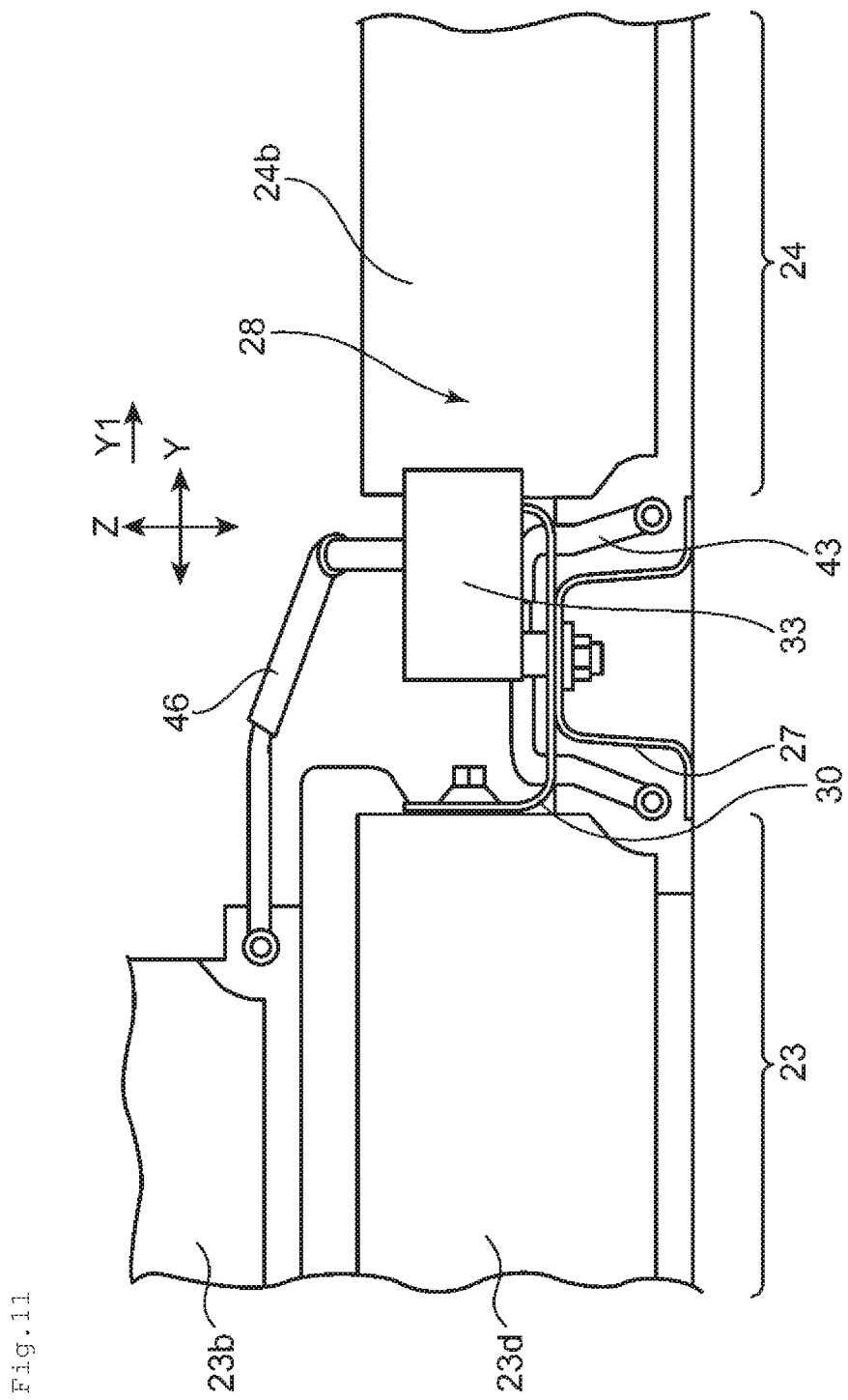
FIG. 11 is a cross-sectional explanatory view illustrating a configuration that the flow divider in FIG. 9 is arranged in an overlapping manner between a first battery module and a second battery module in the single-stage second battery module group when seen in the vehicle width direction and that is cut along a vehicle longitudinal direction.

As illustrated in FIGS. 7 to 8, the connecting pipe 43 in the laterally-facing U shape has: a pair of vehicle width direction portions 43a extending in the vehicle width direction X; and a connecting portion 43b extending in the vehicle longitudinal direction Y in a manner to connect tips of the paired vehicle width direction portions 43a. As illustrated in FIG. 8 and FIG. 11, the connecting pipe 43 in the laterally-facing U shape extends in the vehicle width direction X at a position below a fixing section 30 so as to avoid interference with the fixing section 30 that fixes respective one of the battery modules in the battery module groups 23 to 25 to the crossmember 27. In addition, in order to avoid interference with the crossmember 27, which is illustrated in FIG. 2 and FIG. 11 and extends in the vehicle width direction X, the connecting pipe 43 in the laterally-facing U shape extends in the laterally-facing U shape to an outer side in the vehicle width direction X of end portions of the crossmember 27 while bypassing the crossmember 27.

As described above, the battery pack 5 in this embodiment is configured to include: the first battery module and the second battery module that are arranged adjacent to each other (for example, the battery modules 23d, 24b, which are illustrated in FIG. 2 and FIG. 11 and are adjacent to each other); the first cooling pipe for cooling the first battery module when being supplied with the refrigerant (for example, the cooling pipe 41 that is provided in the module cooling section 35b illustrated in FIG. 3 and abuts the lower surface of the battery module 23d illustrated in FIG. 11); the second cooling pipe for cooling the second battery module when being supplied with the refrigerant (for example, the cooling pipe 41 that is provided in the module cooling section 36b illustrated in FIG. 3 and abuts the lower surface of the battery module 24b illustrated in FIG. 11); and the connecting pipe 43 that communicates between the first cooling pipe and the second cooling pipe in the manner to allow the refrigerant to flow therethrough, the connecting pipe 43 connecting in the manner to allow displacement of a relative position between the first cooling pipe and the second cooling pipe.

According to this configuration, in the battery pack 5, even in the case where the relative position between the first cooling pipe and the second cooling pipe for cooling the two adjacent battery modules 23d, 24b or the like (the cooling pipes 41 that abut the lower surfaces of the battery modules 23d, 24b, or the like) is displaced at the time when these first cooling pipe and second cooling pipe are assembled, during the travel of the vehicle, or the like, it is possible to allow the displacement of the relative position between the first cooling pipe and the second cooling pipe (that is, to absorb the displacement from a target relative position) by the connecting pipe 43. As a result, it is possible to reduce a possibility of damage to the first cooling pipe and the second cooling pipe due to application of bending or tensile stress to these first cooling pipe and second cooling pipe and thus is possible to suppress the reliability of the cooling performance from being degraded.

The above effect by the connecting pipe 43 can be exerted by all of the connecting pipes 43 illustrated in FIG. 3, that is, all of the connecting pipes 43, each of which couples the two adjacent cooling pipes 41 in the vehicle longitudinal direction Y in respective two of the three cooling sections 35, 36, 37.

In addition, as described above, the battery pack 5 in this embodiment is configured that the first cooling pipe abuts the first battery module and the second cooling pipe abuts the second battery module differing from the first battery module. Thus, it is possible to efficiently cool these battery modules.

Figure 15:
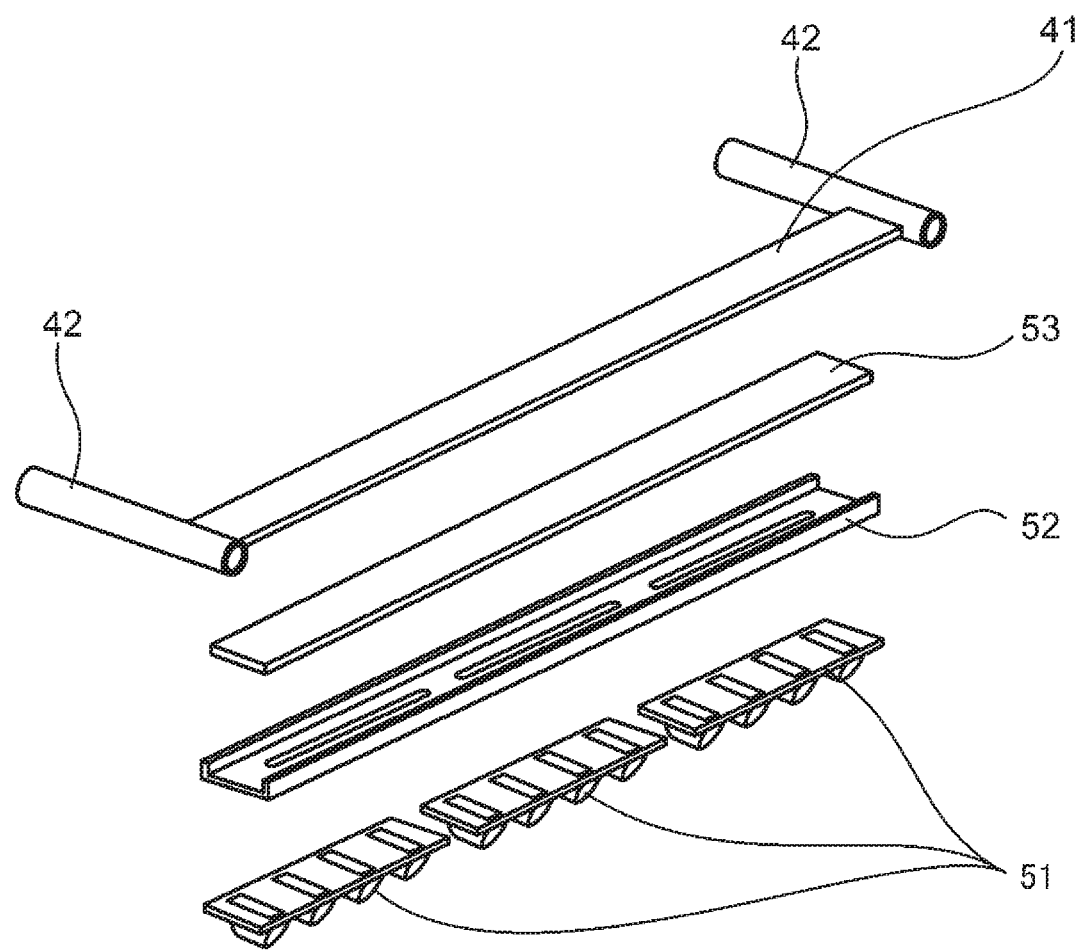
FIG. 15 is an exploded perspective view of a single cooling pipe in the cooling mechanism in FIG. 3 and a peripheral portion thereof.
Figure 16:
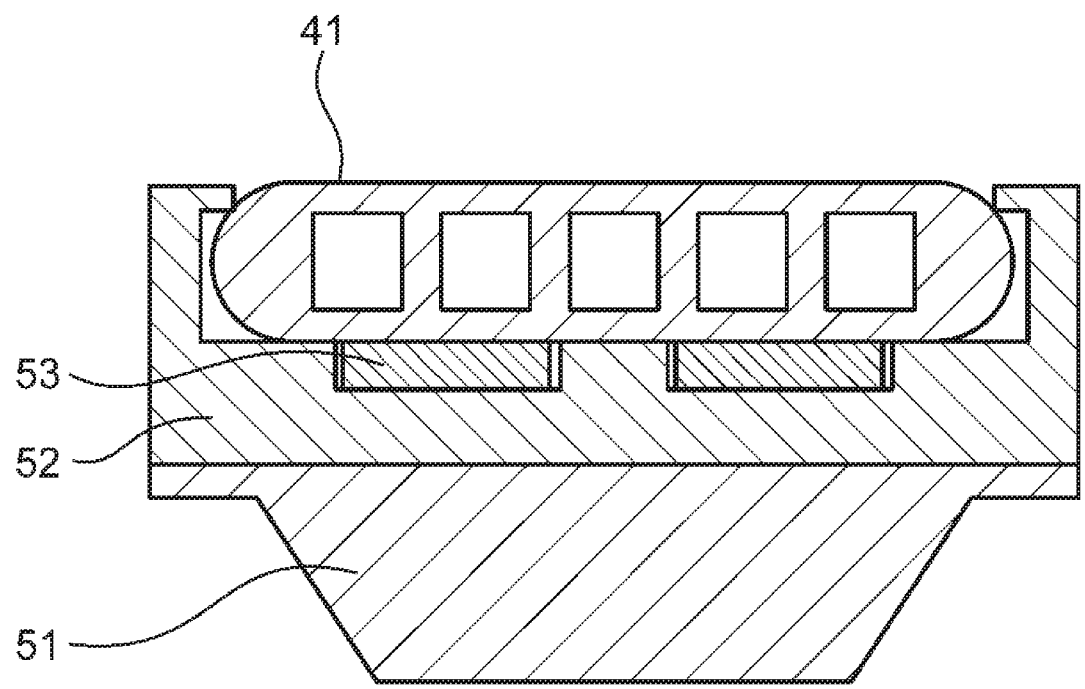
FIG. 16 is a cross-sectional explanatory view of the cooling pipe in the cooling mechanism in FIG. 3 and the peripheral portion thereof in a transverse section.

The battery pack 5 in this embodiment further includes an elastic urging member 51 illustrated in FIGS. 15 to 16 as an urging member that urges the above first cooling pipe to a surface of the first battery module and urges the second cooling pipe to a surface of the second battery module. The elastic urging member 51 is disposed on a lower side of each of the cooling pipes 41 in the module cooling sections (34a, 34b) to (37a, 37b) of the first upper, first lower, second, and third cooling sections 34 to 37 illustrated in FIGS. 3 to 4, and can urge each of the cooling pipes 41 to respective one of the lower surfaces of the battery modules 23a to 25b located above the cooling pipes 41. The elastic urging member 51 is held on the lower side of the cooling pipe 41 by a holder (a holding member) 52 illustrated in FIGS. 15 to 16. In this configuration, the elastic urging members 51 respectively urge the first cooling pipe and the second cooling pipe to the surfaces of the first battery module and the second battery module. In this way, the first cooling pipe and the second cooling pipe can reliably abut the surfaces of the first battery module and the second battery module, respectively. As a result, it is possible to further efficiently cool these battery modules.

In the battery pack 5 of this embodiment, the first cooling pipe is arranged at a position located between the lower surface of the first battery module and the elastic urging member 51. The second cooling pipe is arranged at a position located between the lower surface of the second battery module and the elastic urging member 51. The elastic urging members 51 urge the first cooling pipe to the lower surface of the first battery module and urge the second cooling pipe to the lower surface of the second battery module. In this configuration, the first cooling pipe and the second cooling pipe are interposed between respective one of the lower surfaces of the two different first and second battery modules and the elastic urging member 51, and thus are structured that the relative position between the first cooling pipe and the second cooling pipe is likely to be displaced. Even with such a structure, it is possible to suppress the bending or tensile stress from being applied to the first cooling pipe and the second cooling pipe by allowing the displacement of the relative position between the first cooling pipe and the second cooling pipe by the connecting pipes 43.

As illustrated in FIG. 8 and FIG. 11, the battery pack 5 in this embodiment includes the fixing section 30 that fixes respective one of the first battery module and the second battery module (for example, a combination of the adjacent battery modules 23*d*, 24*b*, a combination of the adjacent battery modules 24*b*, 25*b*, or the like illustrated in FIG. 2 and FIG. 11) to the crossmember 27 as a base portion of the battery pack 5. The fixing section 30 is an L-shaped bracket or the like. The fixing section 30 is arranged between the first battery module and the second battery module described above. The connecting pipe 43 in the laterally-facing U shape is arranged to separate downward from the fixing section 30 in a manner to avoid the fixing section 30. In this configuration, it is possible to avoid the interference between the connecting pipe 43 and the fixing section 30.

In addition, as illustrated in FIG. 8 and FIG. 11, in the battery pack 5 of this embodiment, the first battery module corresponding to the first cooling pipe (for example, the battery module 23*d* in FIG. 11) and the second battery module corresponding to the second cooling pipe (for example, the battery module 24*b* in FIG. 11) are each fixed to the crossmember 27 as the base portion by the different fixing section 30. In this configuration, the first battery module and the second battery module are each fixed to the crossmember 27 as the base portion by the different fixing section 30. Thus, it is structured that an attachment error is likely to occur between the first cooling pipe on the first battery module side and the second cooling pipe on the second battery module side. However, since the displacement of the relative position between the first cooling pipe and the second cooling pipe is allowed by the connecting pipe 43, it is possible to suppress the bending or tensile stress from being applied to the first cooling pipe K and the second cooling pipe.

Furthermore, in the battery pack 5 of this embodiment, the connecting pipe 43 has portions (the vehicle width direction portions 43*a* in FIG. 7), each of which extends in a different direction from a direction (the vehicle longitudinal direction Y in FIG. 7) in which a straight line connecting the first cooling pipe (for example, the cooling pipe 41 in the second cooling section 36 illustrated in FIG. 7) and the second cooling pipe (for example, the cooling pipe 41 in the third cooling section 37 illustrated in FIG. 7) by the shortest distance. Accordingly, the connecting pipe 43 is easily deformed, and it is thus possible to reliably allow the displacement of the relative position between the first cooling pipe and the second cooling pipe by the connecting pipe 43.

The base portion of the battery pack 5 in this embodiment has the crossmembers 27, each of which extends in the vehicle width direction X (see FIG. 2 and FIG. 11). The connecting pipe 43 has portions (the vehicle width direction portions 43*a* in FIG. 7), each of which extends in the vehicle width direction X in the manner to bypass the crossmember 27. Accordingly, the connecting pipe 43 is easily deformed while the interference between the connecting pipe 43 and the crossmember 27 is avoided. As a result, it is possible to reliably allow the displacement of the relative position between the first cooling pipe (for example, the cooling pipe 41 in the second cooling section 36 illustrated in FIG. 7) and the second cooling pipe (for example, the cooling pipe 41 in the third cooling section 37 illustrated in FIG. 7) by the connecting pipe 43. In particular, in this configuration, the connecting pipe 43 has the vehicle width direction portions 43*a*, each of which extends in the vehicle width direction X. Thus, in particular, the connecting pipe 43 is easily deformed in the vehicle longitudinal direction Y and the vertical direction Z, and thus can reliably allow the displacement of the relative position between the first cooling pipe and the second cooling pipe in these directions Y and Z.

In addition, as illustrated in FIG. 7, the vehicle width direction portions 43*a*, each of which extends in the vehicle width direction X in the manner to bypass the crossmember 27, in the connecting pipe 43 extend in a horizontal direction, and the first and second cooling pipes (for example, the cooling pipes 41 in the second to third cooling sections 36, 37) also extend in the horizontal direction. Thus, even in the case where the relative position between the first cooling pipe and the second cooling pipe is displaced vertically, it is possible to absorb such displacement by the deformation of the connecting pipe.

(Description on Expansion Valve 32)

Figure 9:
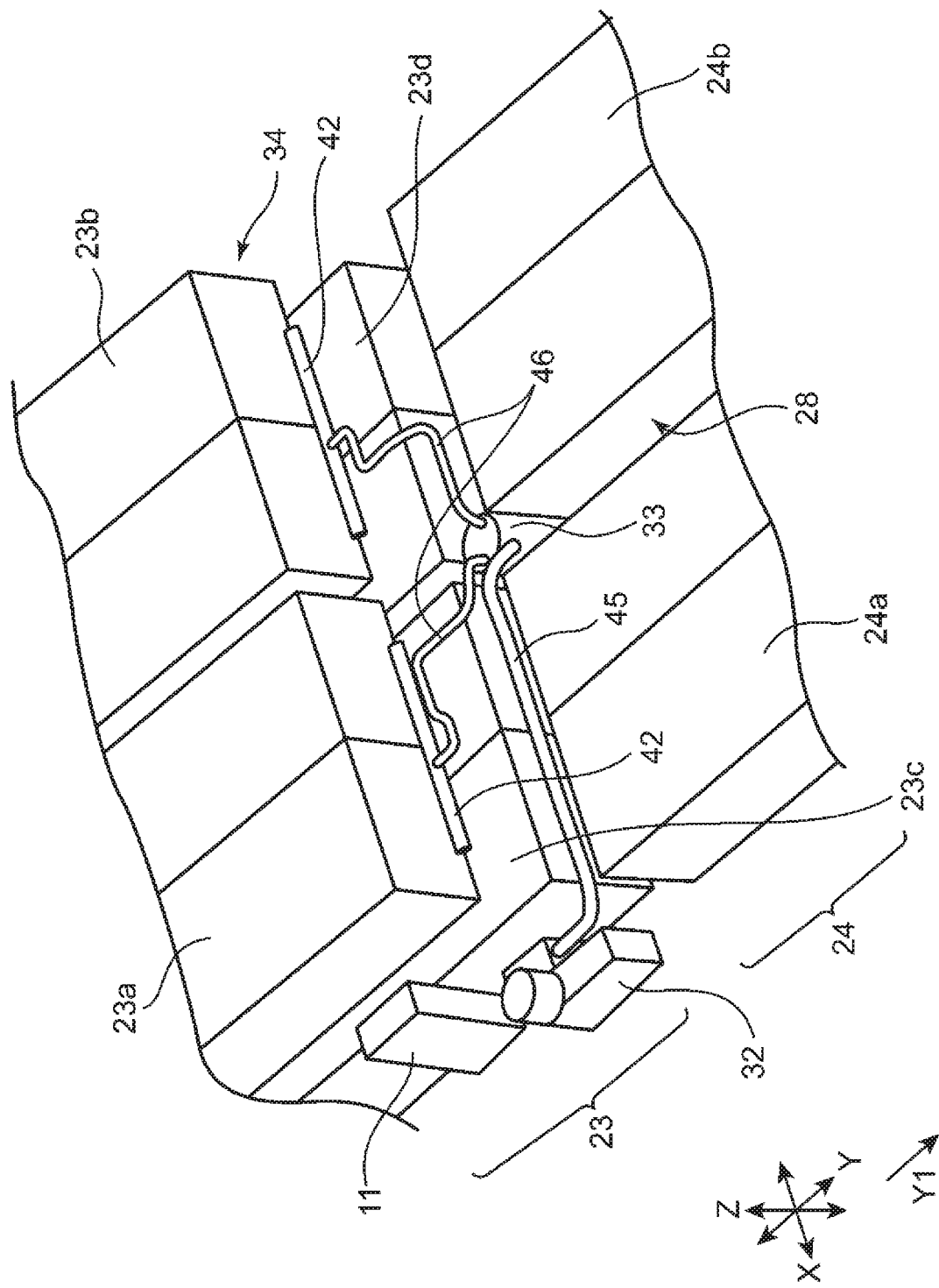
FIG. 9 is an enlarged perspective view illustrating arrangement of an expansion valve, a flow divider, and a second junction box in the battery pack illustrated in FIG. 2.

The battery pack 5 in this embodiment includes: the first battery module group 23 (see FIG. 2) that has the plural battery modules disposed in the plural stages in the overlapping manner in the vehicle vertical direction Z; the cooling pipes 41 (the cooling pipes 41 in the first upper and lower cooling sections 34 in FIG. 3) for cooling the plural battery modules 23*a* to 23*d* of the first battery module group 23 when being supplied with the refrigerant; and the expansion valve 32 (see FIG. 3) that is arranged on the upstream side of the cooling pipes 41 in the flow direction of the refrigerant, expands the refrigerant compressed by the compressor 9 (see FIG. 1), and supplies the refrigerant to the cooling pipes 41. As illustrated in FIG. 9, the expansion valve 32 is arranged at a position that is adjacent to the first battery module group 23 (a lateral position that is adjacent to the first battery module group 23 in the vehicle width direction X in FIG. 9).

In this configuration, since the expansion valve 32 is arranged at the position adjacent to the multi-stage first battery module group 23, the refrigerant in the high cooling performance state immediately after being expanded by the expansion valve 32 can be supplied to the first battery module group 23. Thus, it is possible to improve cooling performance for the first battery module group 23.

In addition, in the battery pack 5 of this embodiment, the expansion valve 32 is arranged at the position adjacent to the first battery module group 23 in the vehicle width direction X. With this configuration, the position that is adjacent to the first battery module group 23 in the vehicle width direction X, that is, an empty space on the lateral side of the first battery module group 23 can be used effectively. Thus, it is possible to suppress enlargement of the battery pack 5.

The vehicle battery pack 5 is arranged in a space having a small vertical distance under the floor of the cabin of the vehicle body 2. Thus, a restriction is imposed on a vertical width of the vehicle battery pack 5. Accordingly, there is a circumstance that it is difficult to arrange the expansion valve 32 above or below the first battery module group 23. When such technical background is concerned, the expansion valve 32 is arranged at the adjacent position, where a sufficient space is available, to the first battery module group 23 in the vehicle width direction X. In this way, it is possible to suppress the enlargement of the vehicle battery pack 5, particularly, in the vertical direction, which is extremely effective in terms of a vehicle layout.

Furthermore, in the battery pack 5 of this embodiment, the expansion valve 32 is connected to the cooling pipes 41, and the end pipes 42, which are arranged on the front side of the battery modules 23a, 23b illustrated in FIG. 9, are provided as front surface side pipes, each of which is arranged to extend in the vehicle width direction X along a front surface of the first battery module group 23 facing the vehicle front direction Y1. In this configuration, the refrigerant in the high cooling performance state immediately after being expanded by the expansion valve 32 flows through the front surface side pipes (the end pipes 42 illustrated in FIG. 9). In this way, it is possible to cool the first battery module group 23 from the front surface. It is also possible to cool the battery modules 24a, 24b of the single-stage second battery module group 24 on the vehicle front direction Y1 side of the front surface side pipes (the end pipes 42 illustrated in FIG. 9) by the front surface side pipes.

As illustrated in FIG. 9, the battery pack 5 in this embodiment further includes the second junction box 11 as the electrical connection box that is electrically connected to the first battery module group 23.

The second junction box 11 is arranged at a position adjacent to the expansion valve 32. For example, the second junction box 11 is arranged at the adjacent position in any of front, rear, and upper directions of the expansion valve 32. In such a configuration that the second junction box 11 is arranged at the position adjacent to the expansion valve 32, air around the expansion valve 32 is cooled in conjunction with the expansion of the refrigerant by the expansion valve 32, and the second junction box 11 can be cooled by using the cooled air. As a result, it is possible to suppress a temperature of the second junction box 11 from becoming high.

Moreover, in the battery pack 5 of this embodiment, as the compressor that compresses the refrigerant to be used in the cooling mechanism 26, the compressor 9 for air-conditioning the inside of the cabin of the vehicle body 2 is used. Accordingly, it is possible to compress the refrigerant for cooling the first battery module group 23 and the other second to third battery module groups 24, 25 by using the compressor 9 for air-conditioning the inside of the cabin. As a result, the single compressor 9 can have two applications of air-conditioning and cooling the battery modules, and thus manufacturing cost of the vehicle can be reduced.

(Description on Flow Divider 33)

Figure 10:
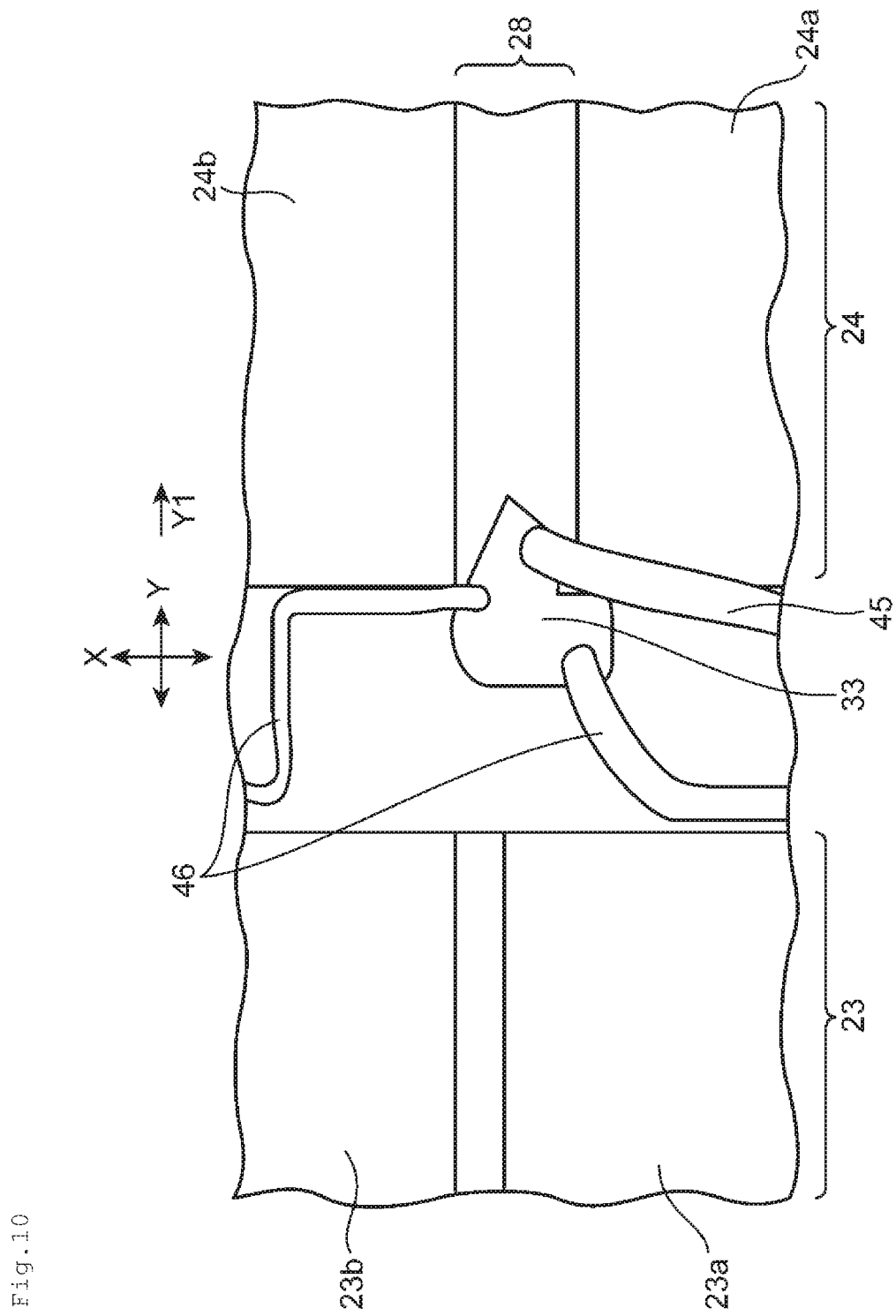
FIG. 10 is a plan view illustrating a state where the flow divider in FIG. 9 is arranged in an overlapping manner between a pair of battery modules in a single-stage second battery module group when seen in a vehicle width direction.

As illustrated in FIGS. 9 to 11, in the battery pack 5 of this embodiment, the flow divider 33 is arranged between the paired battery modules 24a, 24b (the first battery module and the second battery module), which are arranged in alignment in the vehicle width direction X as a specified arrangement direction, in the second battery module group 24. The above "specified arrangement direction" is not limited to the vehicle width direction X and may be the vehicle longitudinal direction Y.

As illustrated in FIGS. 3 to 4, the flow divider 33 as described above delivers the refrigerant in an expanded state that is supplied from the expansion valve 32 through the pipe 46 in a manner to divide the refrigerant to each of the cooling pipes 41 of the paired module cooling sections 34a, 34b in the first upper cooling section 34. The refrigerant that is divided and delivered to the first upper cooling section 34 is sequentially delivered to each of the cooling pipes 41 in the first lower cooling section 35, the second cooling section 36, and the third cooling section 37 that are arranged on the downstream side in the flow direction of the refrigerant while the two flows of the refrigerant that are divided and delivered are kept. As a result, the flow divider 33 can divide and supply a liquid medium to the cooling pipes 41 (the first and second cooling pipes) in the second cooling section 36 that cools the paired battery modules 24a, 24b (the first battery module and the second battery module) located on both sides of the flow divider 33.

According to the above configuration, the flow divider 33 is arranged between the paired battery modules 24a, 24b (the first battery module and the second battery module) that are arranged in alignment in the specified arrangement direction (the vehicle width direction X). Thus, it is possible to improve distributivity of the refrigerant to the paired battery modules 24a, 24b (the first battery module and the second battery module) (that is, uniformity of the refrigerant supply amount to each of the battery modules 23a to 25b).

In addition, it is possible to improve the distributivity of the refrigerant to each of combinations of the other paired battery modules illustrated in FIG. 2, that is, the combination of the battery modules 23a, 23b, the combination of the battery modules 23c, 23d, and the combination of the battery modules 25a, 25b.

As illustrated in FIG. 2, in the battery pack 5 of this embodiment, the paired battery modules 24a, 24b (the first battery module and the second battery module) constitute the single-stage second battery module group 24 in which the battery modules are disposed in the single stage in the vehicle vertical direction Z. In addition to the single-stage second battery module group 24, the battery pack 5 includes the multi-stage first battery module group 23 in which battery modules are disposed in the plural stages in the vehicle vertical direction Z. The single-stage second battery module group 24 and the multi-stage first battery module group 23 are arranged adjacent to each other in a different direction (the vehicle longitudinal direction Y) from the specified arrangement direction (the vehicle width direction X). As illustrated in FIGS. 9 to 11, the flow divider 33 in this embodiment is arranged between the paired battery modules 24a, 24b in the single-stage second battery module group 24.

According to this configuration, even in the case where it is configured that the single-stage second battery module group 24 and the multi-stage first battery module group 23 are arranged adjacent to each other in the different direction (the vehicle longitudinal direction Y) from the specified arrangement direction (the vehicle width direction X), the flow divider 33 is arranged between the paired battery modules 24a, 24b in the single-stage battery module group 24, and thus it is possible to suppress a projection amount of the flow divider 33 from the single-stage second battery module group 24 in the vehicle vertical direction Z. As a result, it is possible to suppress an increase in a dimension (that is, a height) of the vehicle battery pack 5 in the vehicle vertical direction Z.

In the battery pack 5 of this embodiment, the flow divider 33 is arranged in a manner to overlap the single-stage second battery module group 24 when seen in the arrangement direction (when seen in the vehicle width direction X in this embodiment). As a result, it is possible to suppress an increase in a dimension (that is, a height) of the vehicle battery pack 5 in the vehicle vertical direction Z.

In the battery pack 5 of this embodiment, the above the specified arrangement direction is preferably the vehicle width direction X. In such a case, the paired battery modules 24a, 24b (the first battery module and the second battery module) are arranged in alignment in the vehicle width direction X, and the flow divider 33 is arranged therebetween. Thus, it is possible to improve the distributivity of the refrigerant to the paired battery modules 24a, 24b.

In addition, in the case where the flow divider 33 is arranged in the manner to overlap the single-stage battery module group 24 when seen in the vehicle width direction X, it is possible to suppress the increase in each of the dimensions of the vehicle battery pack 5 in the vehicle vertical direction Z and the vehicle longitudinal direction Y.

In the battery pack 5 of this embodiment, the expansion valve 32 that supplies the refrigerant to the flow divider 33 is preferably arranged on the outer side of any of the paired battery modules 24a, 24b (the first battery module and the second battery module) in the vehicle width direction X. With this configuration, it is possible to supply the refrigerant in the high cooling performance state immediately after being discharged from the expansion valve 32 to the flow divider 33 and divide the refrigerant from the flow divider 33 into the paired battery modules 24a, 24b (the first battery module and the second battery module) and each of the combinations of the other paired battery modules illustrated in FIG. 2, that is, the combination of the battery modules 23a, 23b, the combination of the battery modules 23c, 23d, and the combination of the battery modules 25a, 25b. In addition, the position that is adjacent to the first battery module group 23 or the second battery module group 24 in the vehicle width direction X, that is, the empty space on the lateral side of the first battery module group 23 or the second battery module group 24 can be used effectively for the expansion valve 32. Thus, it is possible to suppress the enlargement of the vehicle battery pack 5.

As illustrated in FIGS. 1 to 2 and FIGS. 9 to 11, in the battery pack 5 of this embodiment, a clearance 28 having such a width that the cable C2 (the electric cable) in the vehicle battery pack 5 can be arranged is formed between the paired battery modules 24a, 24b (the first battery module and the second battery module) and the other paired battery modules 25a, 25b. The flow divider 33 is arranged in the clearance 28. With this configuration, not only the flow divider 33 but also the cable C2 can be arranged in the clearance 28 between the paired battery modules 24a, 24b. Thus, it is possible to effectively use a space of the clearance 28 between the paired battery modules 24a, 24b and thus to downsize the entire vehicle battery pack 5.

(Description on Pair of Rear Coupling Pipes 44)

As illustrated in FIG. 2, in the battery pack 5 of this embodiment, the first battery module group 23 includes the four battery modules, that is, the first lower-stage battery module 23c, the first upper-stage battery module 23a that is disposed in the overlapping manner with the first lower-stage battery module 23c in the vehicle vertical direction Z, the second lower-stage battery module 23d that is disposed in alignment with the first lower-stage battery module 23c in the vehicle width direction X, and the second upper-stage battery module 23b that is disposed in the overlapping manner with the second lower-stage battery module 23d in the vehicle vertical direction Z.

As illustrated in FIGS. 3 to 4, in order to cool the four battery modules 23a to 23d of the above first battery module group 23, the cooling mechanism 26 includes the pair of the module cooling sections 34a, 34b of the first upper cooling section 34 and the pair of the module cooling sections 35a, 35b of the first lower cooling section 35. Each of the module cooling sections 34a, 34b, 35a, 35b includes the cooling pipes 41 that abut the lower surface of respective one of the battery modules 23a to 23d for cooling. The cooling pipes 41 in each of the module cooling sections 34a, 34b, 35a, 35b are connected to the end pipe 42 on the vehicle rear side.

As described above, as illustrated in FIGS. 12 to 14, in the battery pack 5 of this embodiment, the paired rear coupling pipes 44 extend obliquely upward in the manner to cross each other. More specifically, as illustrated in FIGS. 12 to 14, the end pipe 42 on the vehicle rear side of the module cooling section 35a (on the lower right side in FIG. 12) for cooling the first lower-stage battery module 23c (see FIG. 2) is connected to the end pipe 42 of the module cooling section 34b (on the upper left side in FIG. 12) for cooling the second upper-stage battery module 23b via the rear coupling pipe 44 (a first connecting pipe) that extends obliquely upward to the left when seen from the vehicle rear side. Similarly, the end pipe 42 on the vehicle rear side of the module cooling section 35b (on the lower left side in FIG. 12) for cooling the second lower-stage battery module 23d is connected to the end pipe 42 of the module cooling section 34a (on the upper right side in FIG. 12) for cooling the first upper-stage battery module 23a via the rear coupling pipe 44 (a second connecting pipe) that extends obliquely upward to the right when seen from the vehicle rear side.

In other words, one (the first connecting pipe) of the rear coupling pipes 44 illustrated in FIGS. 12 to 14 connects the cooling pipes 41 for the first lower-stage battery module 23c (the cooling pipes 41 on the module cooling section 35a side in FIGS. 3 to 4) and the cooling pipes 41 for the second upper-stage battery module 23b (those on the module cooling section 34b side). Meanwhile, the other (the second connecting pipe) of the rear coupling pipes 44 connects the cooling pipes 41 for the first upper-stage battery module 23a (those on the module cooling section 34a side) and the cooling pipes 41 for the second lower-stage battery module 23d (those on the module cooling section 35b side).

With this configuration, it is possible to allow the displacement of the relative position of the cooling pipes 41 for cooling each of the above four battery modules 23a to 23d by respective one of the paired rear coupling pipes 44 (the first connecting pipe and the second connecting pipe). As a result, it is possible to suppress the application of the bending or tensile stress to each of the cooling pipes 41 and thereby suppress the reliability of the cooling performance of the vehicle battery pack 5 from being degraded.

In addition, in the battery pack 5 of this embodiment, the paired rear coupling pipes 44 (the first connecting pipe and the second connecting pipe) are arranged to overlap in a plan view (for example, see a back view in FIG. 13). In this way, it is possible to suppress the enlargement of the vehicle battery pack 5 in the longitudinal direction thereof (that is, the vehicle longitudinal direction Y).

Furthermore, in the battery pack 5 of this embodiment, each of the paired rear coupling pipes 44 (the first connecting pipe and the second connecting pipe) is at least partially formed of an elastically-deformable hose 44a (see FIG. 12). The hose 44a only needs to be an elastically-deformable tubular member and is, for example, a pipe that is made of a resin or metal such as copper. In the configuration of the rear coupling pipes 44, each of which has this hose 44a, compared to a case where each of the paired rear coupling pipes 44 is entirely manufactured by the metal pipe, it is possible to allow displacement of the relative position by the hoses 44a that can elastically be deformed in a small space.

More specifically, as illustrated in FIG. 12, in the battery pack 5 of this embodiment, the paired rear coupling pipes 44 (the first connecting pipe and the second connecting pipe) each include: the elastically-deformable hose 44a; metal pipes 44b; coupling sections 44c, each of which couples the hose 44a and the metal pipe 44b; and a coupling section protector 44d that covers one of the coupling sections 44c. For example, each of the coupling sections 44c is a metallic caulking section or the like.

For example, the coupling section protector 44d is a cylindrical member that is manufactured by a softer material such as the resin than the metal. In FIG. 12, the coupling section protector 44d is provided to any one coupling section 44c of the two vertically-aligned coupling sections 44c, which are adjacent to each other, among the four coupling sections 44c but may be provided to all of the coupling sections 44c.

In this configuration, between the paired rear coupling pipes 44 (the first connecting pipe and the second connecting pipe), interference between the coupling sections 44c, each of which couples the hose 44a and the metal pipe 44b, can be prevented by the coupling section protectors 44d.

In addition, in the battery pack 5 of this embodiment, each of the paired rear coupling pipes 44 (the first connecting pipe and the second connecting pipe) includes a hose protector 44e that covers the hose 44a. In this way, between the paired rear coupling pipes 44 (the first connecting pipe and the second connecting pipe), interference between the hoses 44a can be prevented by the hose protectors 44e.

It is also possible to prevent interference between each of the hoses 44a and the mount 39 (particularly, the base 39a) (see FIG. 14) by the hose protector 44e. In addition, as illustrated in FIG. 6 and FIG. 14, each of the battery modules 23a, 23b is fixed to an end portion on the vehicle rear side of the mount 39 via a bracket 40. However, it is also possible to prevent interference between the hose 44a and the bracket 40 by the above hose protector 44e.

In the battery pack 5 of this embodiment, the paired rear coupling pipes 44 (the first connecting pipe and the second connecting pipe) are arranged in the manner to cross each other (in a so-called cross-coupled fashion). As a result, compared to a case where the paired rear coupling pipes 44 are arranged in a manner not to cross each other, it is possible to reduce a length of each of the paired rear coupling pipes 44.

In other words, in the configuration illustrated in FIGS. 12 to 14, the paired rear coupling pipes 44 extend obliquely upward in the manner to cross each other. Thus, compared to a case where each of the paired rear coupling pipes 44 simply extends in the vehicle vertical direction Z, it is possible to secure the long pipe length.

As illustrated in FIG. 2, FIG. 6, and FIG. 14, in the battery pack 5 of this embodiment, the first upper-stage battery module 23a and the second upper-stage battery module 23b are arranged to be respectively projected more to the rear of the vehicle (in the opposite direction from the arrow Y1 indicative of the vehicle front direction) than the first lower-stage battery module 23c and the second lower-stage battery module 23d, so as to be each formed with a projected portion 49 (see FIG. 6 and FIG. 14). As illustrated in FIG. 6 and FIG. 14, the paired rear coupling pipes 44 (the first connecting pipe and the second connecting pipe) are arranged below the projected portions 49 of the first upper-stage and second upper-stage battery modules 23a, 23b. As a result, the paired rear coupling pipes 44 are protected by the projected portions 49 of the first upper-stage and second upper-stage battery modules 23a, 23b. Thus, it is possible to prevent damage to the paired rear coupling pipes 44 by a collision of another vehicle or the like from the vehicle rear side.

In the above embodiment, the pair of the coupling pipes 44 is provided on the vehicle rear side of the battery modules 23a to 23d. However, the present disclosure is not limited thereto, and the pair of the coupling pipes 44 may be provided on a vehicle front side.

(Description on Elastic Urging Member 51)

As illustrated in FIG. 3, in the battery pack 5 of this embodiment, the cooling mechanism 26 includes the elastic urging member 51, which urges the cooling pipe 41 in a direction (upward) to make the cooling pipe 41 abut the surface (the lower surface in this embodiment) of the battery module (respective one of the battery modules 23a to 25b in FIG. 2), for each of the cooling pipes 41 in the flat plate shapes.

As illustrated in FIG. 15, one or a plurality of the elastic urging members 51 is provided to the single cooling pipe 41. In the example illustrated in FIG. 15, the elastic urging member 51 that is divided into three pieces to facilitate manufacturing by using an existing shaping mold is provided on a lower surface of the single cooling pipe 41.

As illustrated in FIGS. 15 to 16, the elastic urging member 51 is held on the lower surface of the cooling pipe 41 in the flat plate shape via the holder 52 formed of the resin or the like. In addition, in this embodiment, a heater 53 is also held on the lower surface of the cooling pipe 41 by the holder 52. The heater 53 is used to heat respective one of the battery modules 23a to 25b to a specified use condition temperature during driving in a cold region, and the like. The heater 53 can heat the battery module via the cooling pipe 41. The cooling pipe 41 in the flat plate shape only needs to be formed with a channel, through which the refrigerant can flow, therein. As illustrated in FIG. 16, the channel may be divided into a plurality of channels.

Figure 17:
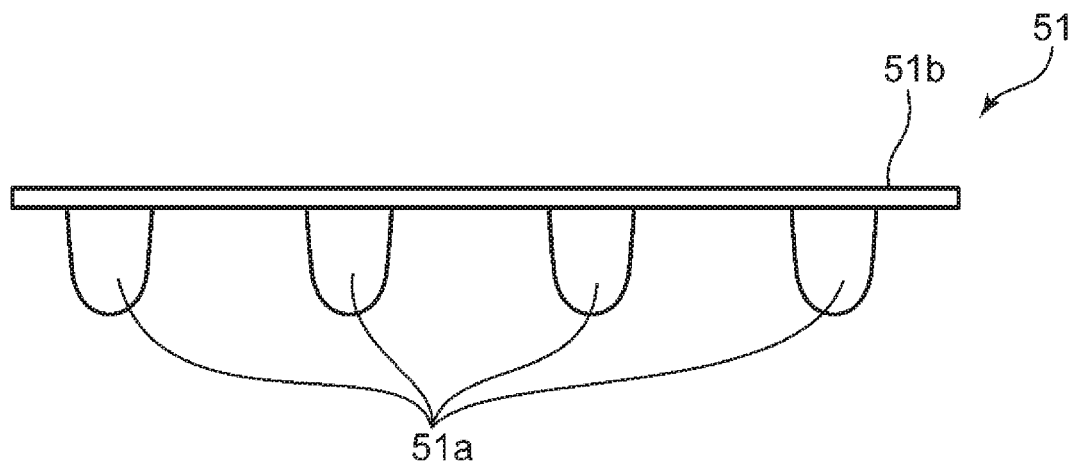
FIG. 17 is a front view of an elastic urging member in FIG. 15.
Figure 18:
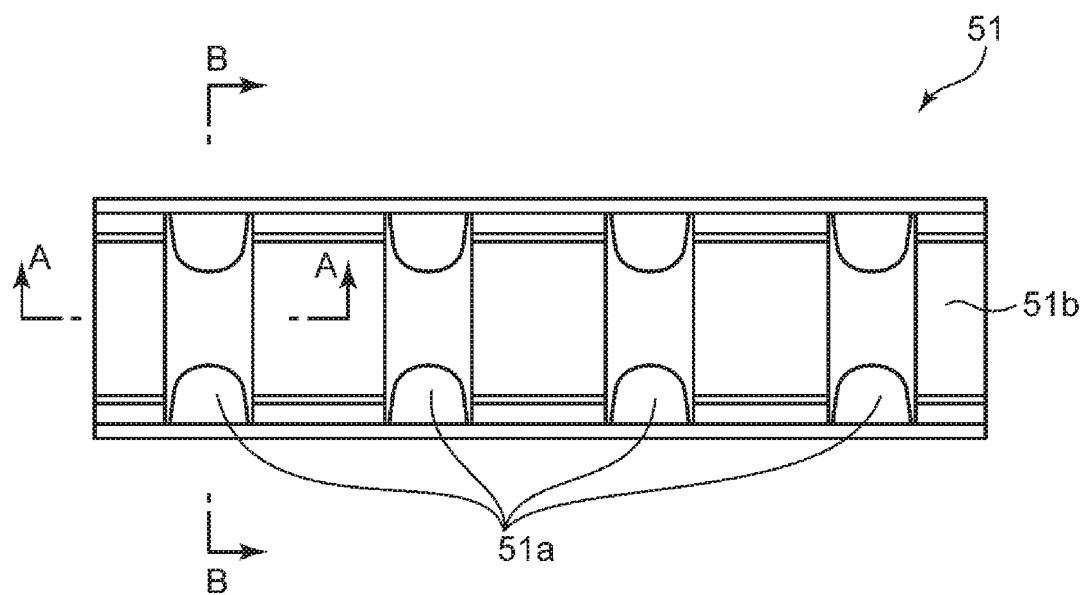
FIG. 18 is a back view of the elastic urging member in FIG. 15.

As illustrated in FIG. 6 and FIGS. 15 to 20, the elastic urging member 51 includes a plurality of elastically-deformable legs 51a that are aligned in the longitudinal direction of the cooling pipe 41. More specifically, the elastic urging member 51 is an elastically-deformable member that is manufactured by using rubber or the like and includes, as illustrated in FIGS. 17 to 18, the plurality (four in FIGS. 17 to 18) of legs 51a and a base 51b that couples root-side end portions at upper ends of these plural legs 51a. The plurality of the legs 51a and the base 51b are integrally molded of an elastically-deformable resin.

Figure 19:
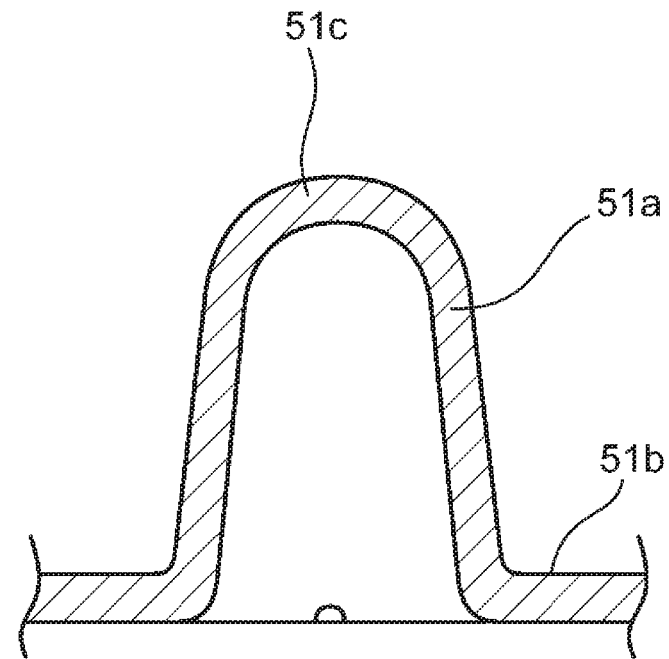
FIG. 19 is a cross-sectional view of the elastic urging member in FIG. 18 that is taken along line A-A.
Figure 20:
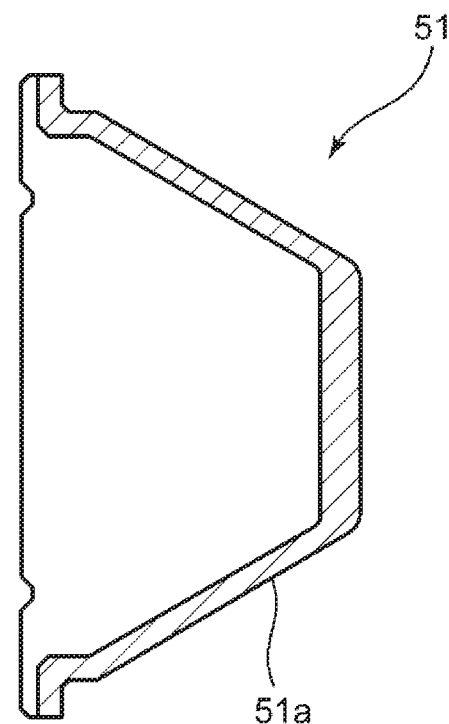
FIG. 20 is a cross-sectional view of the elastic urging member in FIG. 18 that is taken along line B-B.

Each of the legs 51a has a tapered shape overall and, specifically, has a substantially trapezoidal flat plate shape illustrated in FIG. 20. In addition, as illustrated in FIG. 17 and FIG. 19, a tip of the leg 51a is rounded and has a curved surface shape. Furthermore, the leg 51a is molded of the elastically-deformable resin and, as illustrated in FIGS. 19 to 20, has a hollow shape.

The plurality of the legs 51a of the elastic urging member 51 can individually abut an abutment surface of a case for the battery pack 5 or the like (for example, the lower plate 21 in FIG. 2, an upper surface of the mount 39 in FIG. 5, or the like).

In the battery pack 5 of this embodiment, as described above, each of the cooling pipes 41 in the flat plate shapes includes the elastic urging member 51 that urges the cooling pipe 41 in the direction to abut the surface of the battery module. Since this elastic urging member 51 has the plurality of the elastically-deformable legs 51a that are aligned in the longitudinal direction of the cooling pipe 41, it is possible to urge the cooling pipe 41 to the surface of the battery module by each of the legs 51a. In this way, it is possible to suppress a variation in an urging force received by the cooling pipe 41 between a high-temperature time and a low-temperature time. As a result, in a state of receiving the urging force, the variation in which is suppressed (that is, a state where a variation in thermal contact resistance is suppressed), the cooling pipe 41 abuts the surface of the battery module, and a variation in the cooling performance for the battery module by the cooling pipe 41 is thereby suppressed.

In addition, in the battery pack 5 of this embodiment, the cooling pipe 41 can be urged to the lower surface of respective one of the battery modules 23a to 25b by the individual legs 51a of the elastic urging member 51. In this configuration, the battery module is placed on the cooling pipe 41, and thus the elastic urging member 51 can receive weight of the battery module via the cooling pipe 41. As a result, the elastic urging member 51 is elastically deformed by using the weight of the battery module and can urge the cooling pipe 41 to the lower surface of the battery module by using a restoring force of the elastic urging member 51. Thus, with a simple structure that the battery module, the cooling pipe 41, and the elastic urging member 51 are stacked and arranged in the vehicle vertical direction Z, the variation in the urging force received by the cooling pipe 41 is suppressed, and the variation in the cooling performance for respective one of the battery modules 23a to 25b by the cooling pipe 41 is suppressed.

In the above embodiment, the description has been made on the example in which the elastic urging member 51 urges the cooling pipe 41 upward such that the cooling pipe 41 abuts the lower surface of respective one of the battery modules 23a to 25b. However, the present disclosure is not limited thereto. As a modified example, the elastic urging member 51 may urge the cooling pipe 41 laterally such that the cooling pipe 41 abuts a surface other than the lower surface of respective one of the battery modules 23a to 25b, for example, a lateral surface of the battery module.

In the battery pack 5 of this embodiment, since the tip of the leg 51a has the curved surface shape, the leg 51a can smoothly and elastically be deformed when the leg 51a abuts the abutment surface of the case for the battery pack 5, or the like (for example, the lower plate 21 in FIG. 2, the upper surface of the mount 39 in FIG. 5, or the like). As a result, an impact of a variation in a tip shape of the legs 51a becomes small, and thus the cooling pipe 41 can reliably be urged to respective one of the battery modules 23a to 25d.

In the battery pack 5 of this embodiment, since the leg 51a has the hollow shape, the leg 51a can smoothly and easily be deformed elastically when the leg 51a abuts the abutment surface of the case for the battery pack or the like (for example, the lower plate 21 in FIG. 2, the upper surface of the mount 39 in FIG. 5, or the like). As a result, even in the case where an attachment error of the cooling pipe 41 or respective one of the battery modules 23a to 25b25b occurs, such an error can reliably be absorbed by the elastic deformation of the leg 51a, and thus the cooling pipe 41 can further reliably be urged to respective one of the battery modules 23a to 25b.

In the battery pack 5 of this embodiment, since the leg 51a has the tapered shape, the leg 51a can smoothly and elastically be deformed when the leg 51a abuts the abutment surface of the case for the battery pack or the like (for example, the lower plate 21 in FIG. 2, the upper surface of the mount 39 in FIG. 5, or the like). As a result, the impact of the variation in the tip shape of the legs 51a becomes small, and thus the cooling pipe 41 can reliably be urged to the battery module.

As illustrated in FIG. 15, in the battery pack 5 of this embodiment, since the elastic urging member 51 is configured to be divided into the plural (four in FIG. 15) pieces, it is possible to improve productivity of the elastic urging member 51. More specifically, the elastic urging member 51 can be molded by using the existing shaping mold, and thus the manufacturing cost can be reduced.

As illustrated in FIG. 6, in the battery pack 5 of this embodiment, each of the battery modules 23a to 25d has plural sheets of battery cells 29. In addition, it is designed that the number of the legs 51a of the elastic urging member 51 is the same as the number of the battery cells 29. Furthermore, the plural legs 51a are arranged in alignment in an alignment direction of the plural battery cells 29 (the vehicle longitudinal direction Y in FIG. 6). Each of the legs 51a is arranged at a position capable of applying the upward urging force to respective one of the battery cells 29. In this configuration, the plural legs 51a of the elastic urging member 51 can apply the uniform urging force to the plural sheets of the battery cells 29 in each of the battery modules 23a to 25b. Accordingly, there is no case where the excessive urging force is applied to the certain battery cell 29, and thus a possibility that only such a battery cell 29 individually moves upward to damage an electrical connection section, such as a bus bar, between the battery cells is reduced.

As illustrated in FIGS. 15 to 16, the battery pack 5 in this embodiment includes the holder 52 as the holding member that is arranged between the cooling pipe 41 and the elastic urging member 51 and holds the elastic urging member 51 on the cooling pipe 41. In this configuration, since the holder 52 (the holding member) holds the cooling pipe 41 at the position between the cooling pipe 41 and the elastic urging member 51, a holding property for the cooling pipe 41 can be improved. As a result, the elastic urging members 51 apply the uniform urging force to the cooling pipes 41, and thus the battery modules 23a to 25b can be cooled evenly by the cooling pipes 41.

As illustrated in FIGS. 15 to 16, the battery pack 5 in this embodiment includes the heater 53 that heats respective one of the battery modules 23a to 25b. The holder 52 (the holding member) holds the heater 53 at a position capable of heating respective one of the battery modules 23a to 25b. In this configuration, since the holder 52 (the holding member) holds the heater 53 at the position capable of heating respective one of the battery modules 23a to 25b, it is possible to reliably heat the battery modules 23a to 25b evenly.

The elastic urging member 51 may be made of the resin or the metal instead of the rubber as described above as long as the elastic urging member 51 is configured to be able to urge the cooling pipe 41 to respective one of the battery modules 23a to 25b.

What is claimed is:

1. A vehicle battery pack comprising:
   a battery module;
   a cooling pipe in a flat plate shape that abuts a surface of the battery module, the cooling pipe having a longitudinal axis along which a cooling fluid flows, and a width perpendicular to the longitudial axis of the cooling pipe; and an urging member configured to urge the cooling pipe in a direction to abut the surface of the battery module, the urging member has plural elastically-deformable legs that are aligned along the longitudinal axis of the cooling pipe;

wherein a longitudinal axis of each of the legs extends substantially perpendicular to the longitudinal axis of the cooling pipe, and each of the legs extends along the longitudinal axis of the respective leg across an entirety of the width of the cooling pipe; and wherein each of the legs has a trapezoidal flat plate shape in the form of a single trapezoid when viewed in a transverse section perpedendicular to the longitudinal axis of the cooling pipe.

2. The vehicle battery pack according to claim 1, wherein the surface of the battery module is a lower surface of the battery module.

3. The vehicle battery pack according to claim 2, wherein a tip of each of the legs has a curved surface shape.

4. The vehicle battery pack according to claim 2, wherein each of the legs has a hollow shape.

5. The vehicle battery pack according to claim 2, wherein each of the legs has a tapered shape.

6. The vehicle battery pack according to claim 3, wherein each of the legs has a hollow shape.

7. The vehicle battery pack according to claim 3, wherein each of the legs has a tapered shape.

8. The vehicle battery pack according to claim 7, wherein the battery module has plural sheets of battery cells, a number of the legs is the same as a number of the battery cells, the plural legs are arranged in alignment in an alignment direction of the plural sheets of the battery cells, and each of the legs is arranged at a position configured to apply an urging force to respective one of the battery cells.

9. The vehicle battery pack according to claim 7, further comprising:

a holding member that is arranged between the cooling pipe and the urging member and is configured to hold the urging member relative to the cooling pipe.

10. The vehicle battery pack according to claim 9, further comprising:

a heater configured to heat the battery module, wherein the holding member is configured to hold the heater at a position capable of heating the battery module.

11. The vehicle battery pack according to claim 1, wherein a tip of each of the legs has a curved surface shape.

12. The vehicle battery pack according to claim 1, wherein each of the legs has a hollow shape.

13. The vehicle battery pack according to claim 12, wherein the urging member comprises plural pieces.

14. The vehicle battery pack according to claim 1, wherein each of the legs has a tapered shape.

15. The vehicle battery pack according to claim 1, wherein the urging member comprises plural pieces.

16. The vehicle battery pack according to claim 1, wherein the battery module has plural sheets of battery cells, a number of the legs is the same as a number of the battery cells, the plural legs are arranged in alignment in an alignment direction of the plural sheets of the battery cells, and each of the legs is arranged at a position configured to apply an urging force to respective one of the battery cells.

17. The vehicle battery pack according to claim 1, further comprising:

a holding member that is arranged between the cooling pipe and the urging member and is configured to hold the urging member relative to the cooling pipe.

18. The vehicle battery pack according to claim 17, further comprising:

a heater configured to heat the battery module, wherein the holding member is configured to hold the heater at a position capable of heating the battery module.

* * * * *